(12) United States Patent
Schmitt et al.

(10) Patent No.: US 10,139,792 B2
(45) Date of Patent: Nov. 27, 2018

(54) BUILDING MANAGEMENT SYSTEM WITH HEURISTICS FOR CONFIGURING BUILDING SPACES

(71) Applicant: Johnson Controls Technology Company, Holland, MI (US)

(72) Inventors: John J. Schmitt, Milwaukee, WI (US); Justin R. Debbink, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 567 days.

(21) Appl. No.: 14/872,105

(22) Filed: Sep. 30, 2015

(65) Prior Publication Data

US 2017/0090441 A1    Mar. 30, 2017

(51) Int. Cl.
    *G05B 15/02*    (2006.01)
(52) U.S. Cl.
    CPC .................................. *G05B 15/02* (2013.01)
(58) Field of Classification Search
    CPC ............ G05B 15/02; G05B 2219/2642; G06F 17/30592; G06F 17/30994
    USPC .................... 700/275; 715/700, 735
    See application file for complete search history.

(56) References Cited

U.S. PATENT DOCUMENTS

| | | | |
|---|---|---|---|
| 6,141,595 A * | 10/2000 | Gloudeman | G05B 15/02 700/83 |
| 7,634,555 B1 * | 12/2009 | Wainscott, Jr. | H04L 67/02 700/19 |
| 7,664,574 B2 * | 2/2010 | Imhof | G05B 15/02 700/276 |
| 8,947,437 B2 | 2/2015 | Garr et al. | |
| 9,170,574 B2 | 10/2015 | Fuller et al. | |
| 9,305,136 B2 * | 4/2016 | K M | G06F 17/509 |
| 9,571,986 B2 * | 2/2017 | Gottschalk | G06F 17/50 |
| 2009/0307255 A1 * | 12/2009 | Park | G06Q 10/10 |
| 2010/0281387 A1 | 11/2010 | Holland et al. | |
| 2011/0055748 A1 | 3/2011 | Vacariuc | |
| 2011/0093493 A1 | 4/2011 | Nair et al. | |
| 2013/0297198 A1 * | 11/2013 | Vande Velde | G01C 21/28 701/409 |
| 2015/0277407 A1 * | 10/2015 | Vanderkoy | G05B 15/02 700/275 |

* cited by examiner

*Primary Examiner* — Chun Cao
(74) *Attorney, Agent, or Firm* — Foley & Lardner LLP

(57) ABSTRACT

A building management system (BMS) includes building equipment located within a building space and a controller that receives input from the building equipment and provides a control signal to the building equipment. A floorplan geolocator receives a map providing geolocation data and overlays a building floorplan onto the map. A space geolocator receives an input defining a location of the building space relative to the floorplan and determines a geolocation of the building space using the geolocation data. A equipment geolocator receives an input defining a location of the building equipment relative to the floorplan and determines a geolocation of the building equipment using the geolocation data. A parent space detector uses geometric heuristics and the geolocations of the building space and the building equipment to identify a spatial relationship between the building space and the building equipment. The controller uses the spatial relationship to generate the control signal.

20 Claims, 28 Drawing Sheets

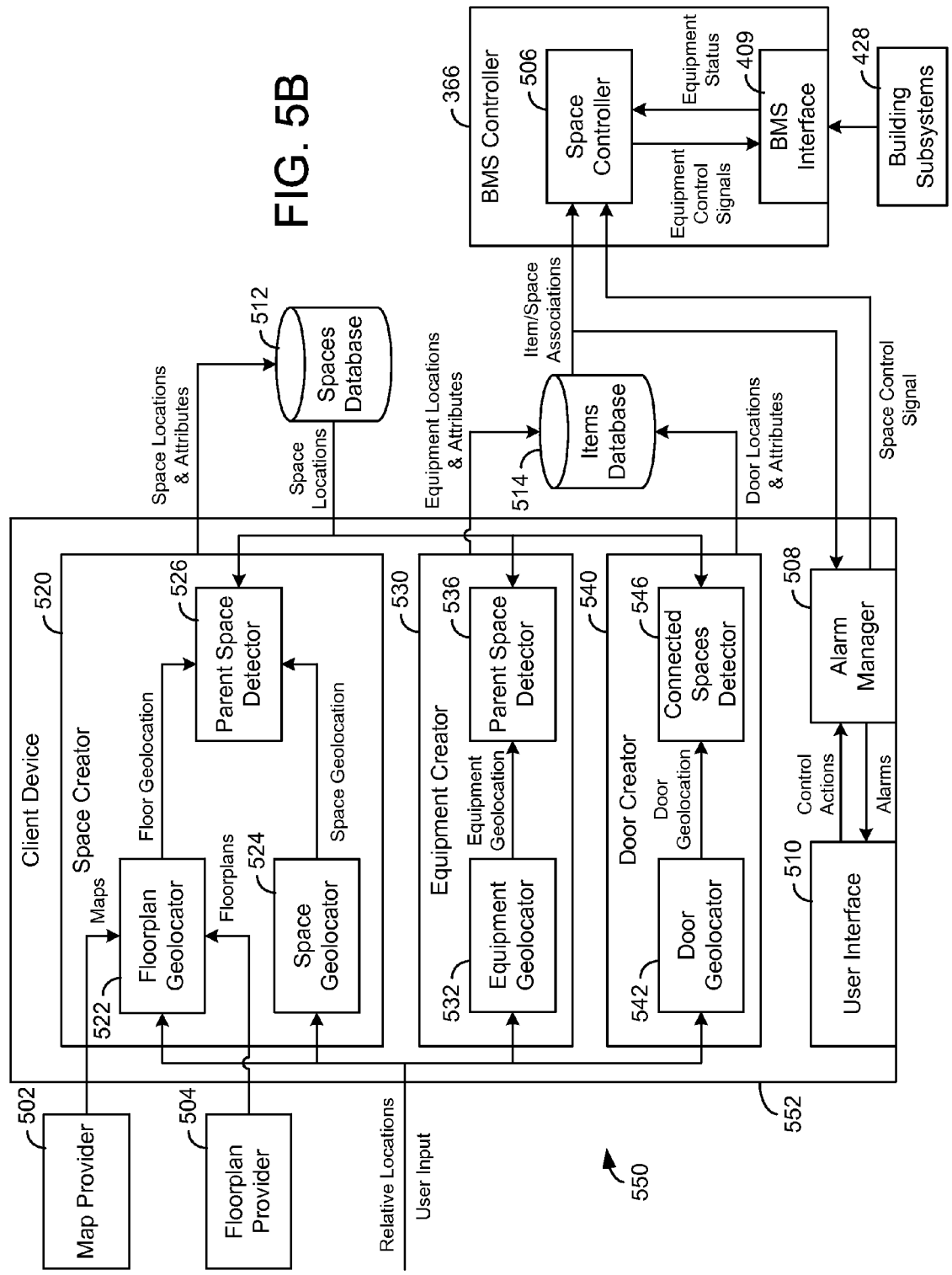

BUILDING MANAGEMENT SYSTEM WITH HEURISTICS FOR CONFIGURING BUILDING SPACES

BACKGROUND

The present invention relates generally to building management systems (BMSs). The present invention relates more particularly to a building management system with heuristics for configuring building spaces.

A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

Some BMSs allow users to create building spaces and associate building equipment with building spaces. However, conventional BMSs require the user to manually create and name each building space, and then manually identify its geolocation. The user is also required to explicitly state the relationship to other areas, which can be error prone. If the data entered by the user is incorrect, it can be difficult to identify and correct the error. It would be desirable to provide a BMS that overcomes these and other disadvantages of conventional BMSs.

SUMMARY

One implementation of the present disclosure is a building management system (BMS). The BMS includes building equipment located within a building space and a controller that receives input from the building equipment and provides a control signal to the building equipment. The BMS includes a floorplan geolocator, a space geolocator, and an equipment geolocator. The floorplan geolocator receives a map providing geolocation data and overlays a building floorplan onto the map. The space geolocator receives a first input defining a location of the building space relative to the floorplan and determines a geolocation of the building space using the geolocation data. The equipment geolocator receives a second input defining a location of the building equipment relative to the floorplan and determines a geolocation of the building equipment using the geolocation data. The BMS further includes a parent space detector that uses geometric heuristics and the geolocations of the building space and the building equipment to identify a spatial relationship between the building space and the building equipment. The controller uses the spatial relationship between the building space and the building equipment to generate the control signal provided to the building equipment.

In some embodiments, the floorplan geolocator uses the geolocation data provided by the map to determine a geolocation of the floorplan. The space geolocator may use the geolocation of the floorplan and the location of the building space relative to the floorplan to determine the geolocation of the building space. The equipment geolocator may use the geolocation of the floorplan and the location of the building equipment relative to the floorplan to determine the geolocation of the building equipment.

In some embodiments, the space geolocator generates and provides a graphical user interface that displays the floorplan overlaid onto the map. The first input defining the location of the building space relative to the floorplan may include a user input received via the graphical user interface. In some embodiments, the first input defining the location of the building space relative to the floorplan includes a user drawing a border of the building space onto the floorplan via a graphical user interface.

In some embodiments, the equipment geolocator generates and provides a graphical user interface that displays the floorplan overlaid onto the map. The second input defining the location of the building equipment relative to the floorplan may include a user input received via the graphical user interface. In some embodiments, the second input defining the location of the building equipment relative to the floorplan includes a user placing an icon representing the building equipment onto the floorplan via a graphical user interface.

In some embodiments, the parent space detector identifies a parent space for the building equipment. Identifying the parent space for the building equipment may include identifying a smallest existing building space that contains the building equipment and setting the identified building space as the parent space for the building equipment.

In some embodiments, the parent space detector identifies a parent space for the building space. Identifying the parent space for the building space may include determining an area of the building space, determining a location of a centroid of the building space, identifying a smallest existing building space that contains the centroid and has an area larger than the area of the building space, and setting the identified building space as the parent space for the building space.

In some embodiments, the BMS includes an alarm manager that generates and provides a graphical user interface for viewing and managing alarms in the building management system. The alarm manager may receive a user input via the graphical user interface. The user input may include a desired control action for the building space without identifying the building equipment. The controller may use the spatial relationship between the building space and the building equipment to identify the building equipment and generate the control signal for the building equipment to effect the desired control action.

Another implementation of the present disclosure is a method for establishing relationships between building spaces and building equipment in a building management system. The method includes generating and providing a control signal from a controller of the building management system to building equipment located within a building space. The method includes overlaying a building floorplan onto a map providing geolocation data. The method includes receiving a first input defining a location of the building space relative to the floorplan and a second input defining a location of the building equipment relative to the floorplan. The method includes determining a geolocation of the building space and a geolocation of the building equipment using the geolocation data. The method includes identifying a spatial relationship between the building space and the building equipment using geometric heuristics and the geolocations of the building space and the building equipment. The controller uses the spatial relationship between the building space and the building equipment to generate the control signal provided to the building equipment.

In some embodiments, the method includes determining a geolocation of the floorplan using the geolocation data provided by the map, using the geolocation of the floorplan and the location of the building space relative to the floorplan to determine the geolocation of the building space, and using the geolocation of the floorplan and the location of the building equipment relative to the floorplan to determine the geolocation of the building equipment.

In some embodiments, the method includes generating and providing a graphical user interface that displays the floorplan overlaid onto the map. At least one of the first input defining the location of the building space relative to the floorplan and the second input defining the location of the building equipment relative to the floorplan may include a user input received via the graphical user interface. In some embodiments, the first input defining the location of the building space relative to the floorplan includes a user drawing a border of the building space onto the floorplan via a graphical user interface. In some embodiments, the second input defining the location of the building equipment relative to the floorplan includes a user placing an icon representing the building equipment onto the floorplan via a graphical user interface.

In some embodiments, identifying the spatial relationship between the building space and the building equipment includes identifying a parent space for the building equipment and determining whether the building space is the parent space for the building equipment. Identifying the parent space for the building equipment may include identifying a smallest existing building space that contains the building equipment and setting the identified building space as the parent space for the building equipment.

In some embodiments, the method includes identifying a parent space for the building space. Identifying the parent space for the building space may include determining an area of the building space, determining a location of a centroid of the building space, identifying a smallest existing building space that contains the centroid and has an area larger than the area of the building space, and setting the identified building space as the parent space for the building space.

In some embodiments, the method includes providing a graphical user interface for viewing and managing alarms in the building management system and receiving a user input via the graphical user interface. The user input may include a desired control action for the building space without identifying the building equipment. The method may further include using the spatial relationship between the building space and the building equipment to identify the building equipment and generating the control signal for the building equipment to effect the desired control action.

Another implementation of the present disclosure is a building management system (BMS). The BMS includes building equipment located within a building space and a controller that receives input from the building equipment and provides a control signal to the building equipment. The BMS includes a space geolocator and an equipment geolocator. The space geolocator receives a first input defining a location of the building space relative to a map and determines a geolocation of the building space using geolocation data provided by the map. The equipment geolocator that receives a second input defining a location of the building equipment relative to the map and determines a geolocation of the building equipment using the geolocation data provided by the map. The BMS includes a parent space detector that uses geometric heuristics to identify the building space as a parent space that contains the building equipment. The controller establishes a control relationship between the building space and the building equipment in response to identifying the building space as the parent space and uses the control relationship to generate the control signal provided to the building equipment.

In some embodiments, the BMS includes an alarm manager that generates a graphical user interface for viewing and managing alarms in the building management system. The alarm manager may receive a user input via the graphical user interface. The user input may include a desired control action for the building space without identifying the building equipment. The controller may receive the desired control action from the alarm manager and use the control relationship between the building space and the building equipment to identify the building equipment and generate one or more control signals for the building equipment.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 5B is a block diagram of a system in which the space creator, equipment creator, door creator, and alarm manager are components of a client device that communicates with a BMS controller, according to an exemplary embodiment.

DETAILED DESCRIPTION

Figure 1:
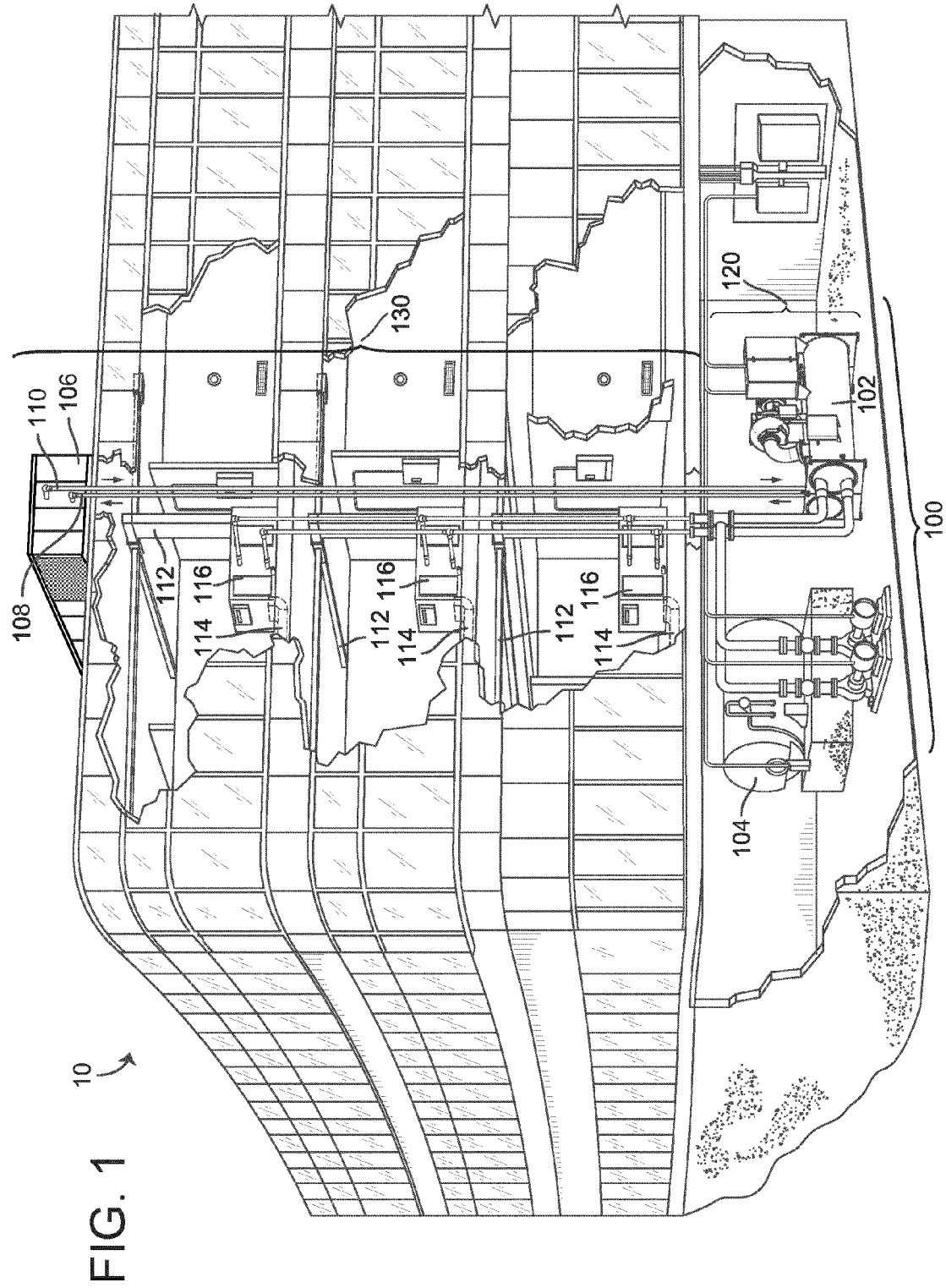
FIG. 1 is a drawing of a building equipped with a building management system (BMS), according to an exemplary embodiment.

Referring generally to the FIGURES, a building management system (BMS) with heuristics for configuring building spaces is shown, according to an exemplary embodiment. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS may facilitate the creation of a building model and/or a building control interface that can be used to monitor and control building spaces and the equipment contained therein. In some embodiments, the BMS simplifies the process of naming areas and items within a building (e.g., equipment, doors, etc.) and establishing their geolocation (i.e., location relative to the Earth) and spatial relationships to other areas and/or items. For example, the BMS may overlay a floor plan of a building directly onto a map (e.g., a street map). Once the floorplan is placed on the map, the BMS can determine the geolocation of the building using geolocation data provided by the map.

The BMS may be configured to generate and provide a graphical user interface for identifying or defining building spaces. Building spaces may include, for example, floors, areas, rooms, zones, stairwells, or other areas or regions of interest within a building. Building spaces may be identified or defined within a floor plan or within another building space. In some embodiments, the user interface includes drawing tools that allow a user to draw the borders of a building space. For example, a user can trace a border along one or more walls shown in the floorplan to define the location of a building space relative to the floorplan. The BMS may then automatically determine the geolocation of the building space using the geolocation data provided by the map onto which the floorplan is overlaid.

In some embodiments, the user interface includes tools that allow a user to identify or define the locations of equipment, doors, objects, and/or other types of items within building spaces. For example, a user can drag and drop an icon representing a real-world item onto the floorplan to define the location of the item relative to the floorplan. The BMS may then automatically determine the geolocation of the item using the geolocation data provided by the map.

The BMS may use geometric heuristics to establish relationships between building spaces and the items within building spaces. For example, when a building space is created, the BMS may automatically determine whether the building space is contained within another building space and/or whether the building space contains other building spaces. For each building space, the BMS may identify any parent spaces that contain the building space and any child spaces that are contained within the building space. For each item, the BMS may identify one or more parent spaces that contain the item. If an item is moved (e.g., due to a physical move in the real world or because it was incorrectly placed), the BMS may automatically update the item's spatial relations and geolocation. If a building space is deleted, the BMS may automatically update the parent space information for any items and/or spaces contained within the deleted building space.

Advantageously, the geometric heuristics used by the BMS to determine relationships between building spaces and the items within building spaces may reduce user errors when configuring the building spaces. Since the spatial and hierarchical relationships generated by the BMS are derived from the locations of the building spaces on the map, the relationships generated by the BMS accurately represent the locations of the building spaces and items as shown in the graphical user interface.

The BMS may be configured to use the relationships between building spaces and the items contained therein to monitor and control the building spaces. For example, an alarm or fault detected for a piece of equipment associated with a building space may be shown in the graphical user interface as an alarm associated with the space. A command or control action can be provided to the BMS as an action for a building space (e.g., lock all doors in a space). The BMS may use the relationships between spaces and items to identify relevant equipment within a building space and provide a control signal to the identified equipment. These and other features of the BMS are described in greater detail below.

Building Management System

Referring now to FIGS. 1-4, an exemplary building management system (BMS) in which the systems and methods of the present invention may be implemented are shown, according to an exemplary embodiment. Referring particularly to FIG. 1, a perspective view of a building 10 is shown. Building 10 is served by a BMS that includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
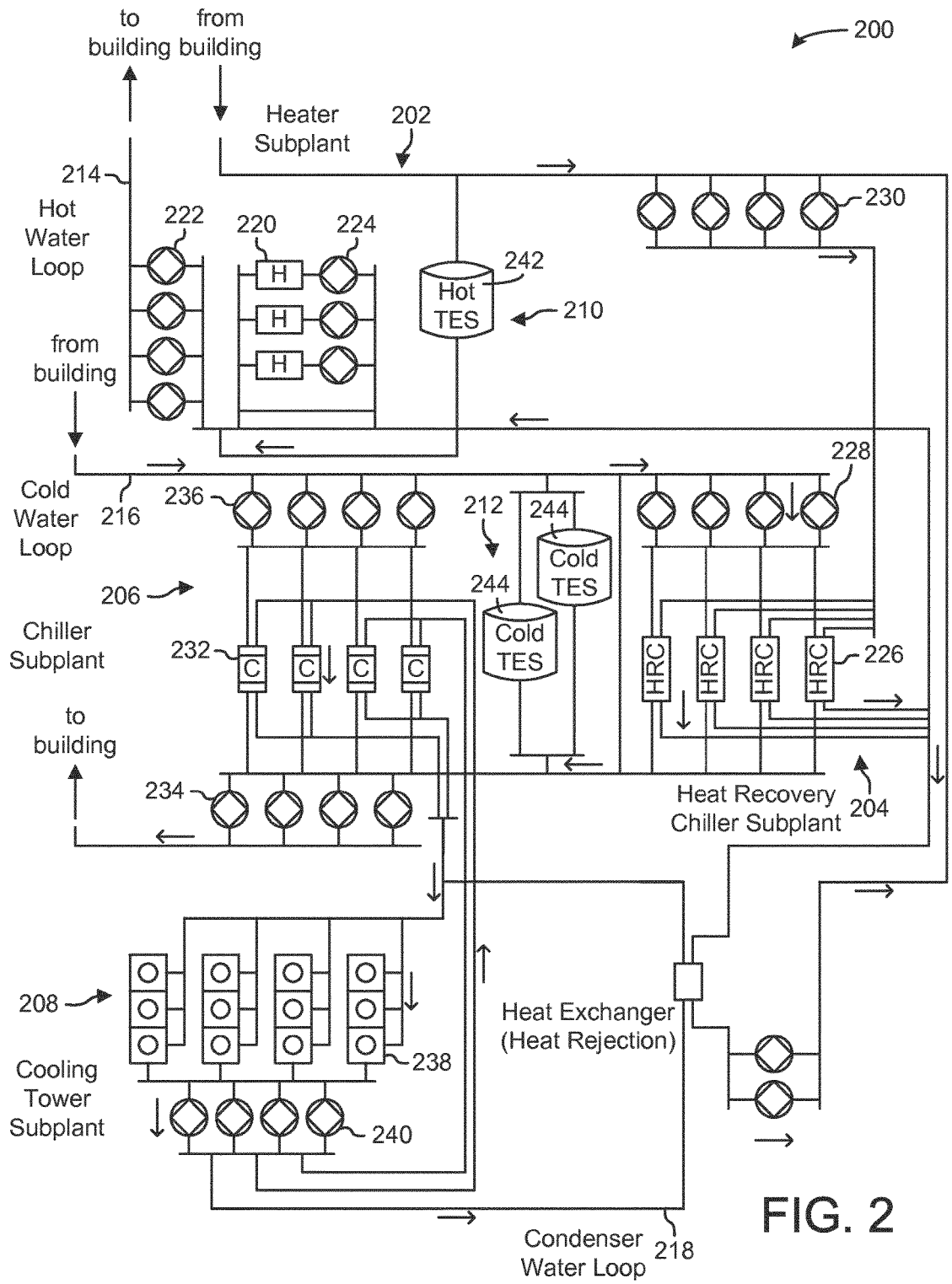
FIG. 2 is a schematic of a waterside system which may be used to provide heating and/or cooling for the building of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
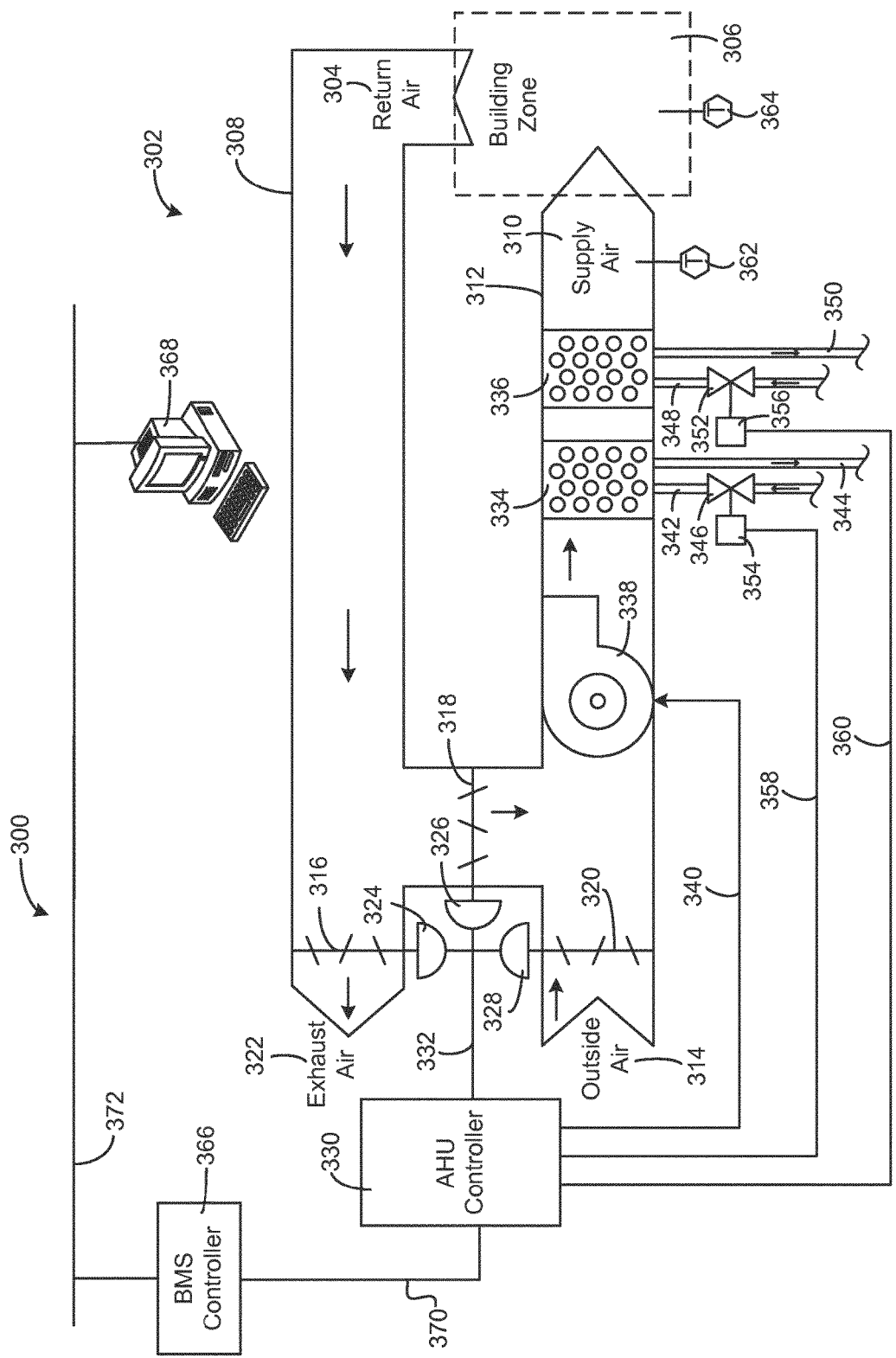
FIG. 3 is a block diagram of an airside system which may be used to provide heating and/or cooling for the building of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
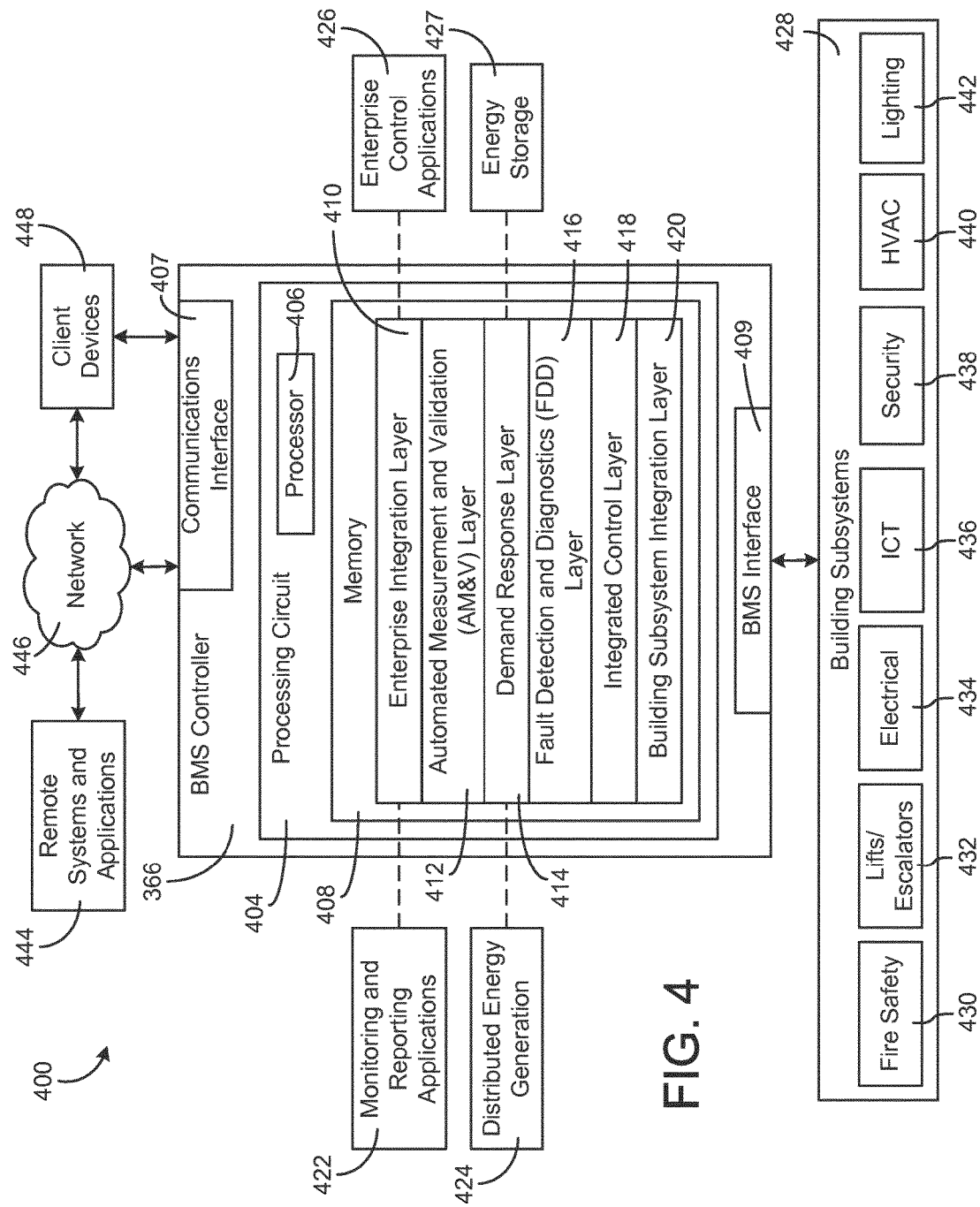
FIG. 4 is a block diagram illustrating a portion of the BMS of FIG. 1 in greater detail, showing a BMS controller configured to operate building subsystems that provide services to the building, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Configuring and Controlling Building Spaces

Figure 5A:
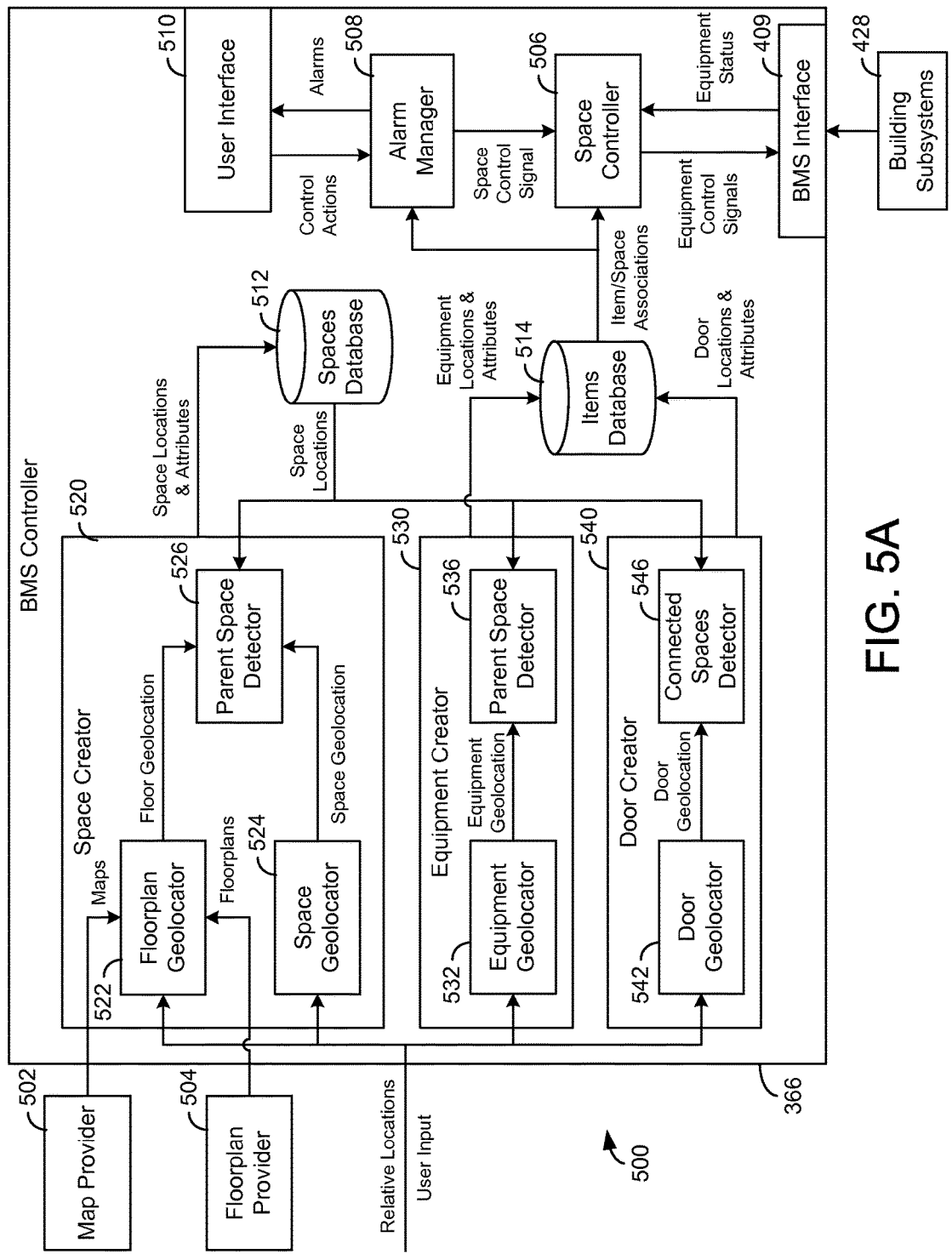
FIG. 5A is block diagram illustrating the BMS controller of FIG. 4 in greater detail, showing a space creator, an equipment creator, a door creator, an alarm manager, and a space controller, according to an exemplary embodiment.

Referring now to FIG. 5A, a block diagram of a system 500 for configuring and controlling building spaces is shown, according to an exemplary embodiment. System 500 may facilitate the creation of a building model and/or a building control interface that can be used to monitor and control building spaces and the equipment contained therein. In some embodiments, system 500 simplifies the process of naming areas and items within a building (e.g., equipment, doors, etc.) and establishing their geolocation (i.e., location relative to the Earth) and spatial relationships to other areas and/or items. For example, system 500 may overlay a floor plan of a building directly onto a map (e.g., a street map). Once the floorplan is placed on the map, system 500 can determine the geolocation of the building using geolocation data provided by the map.

System 500 may be configured to generate and provide a graphical user interface for identifying or defining building spaces. Building spaces may include, for example, floors, areas, rooms, zones, stairwells, or other areas or regions of interest within a building. Building spaces may be identified or defined within a floor plan or within another building space. In some embodiments, the user interface includes drawing tools that allow a user to draw the borders of a building space. For example, a user can trace a border along one or more walls shown in the floorplan to define the location of a building space relative to the floorplan. System 500 may then automatically determine the geolocation of the building space using the geolocation data provided by the map onto which the floorplan is overlaid.

In some embodiments, the user interface includes tools that allow a user to identify or define the locations of equipment, doors, objects, and/or other types of items within building spaces. For example, a user can drag and drop an icon representing a real-world item onto the floorplan to define the location of the item relative to the floorplan. System 500 may then automatically determine the geolocation of the item using the geolocation data provided by the map.

System 500 may use geometric heuristics to establish relationships between building spaces and the items within building spaces. For example, when a building space is created, system 500 may automatically determine whether the building space is contained within another building space and/or whether the building space contains other building spaces. For each building space, system 500 may identify any parent spaces that contain the building space and any child spaces that are contained within the building space. For each item, system 500 may identify one or more parent spaces that contain the item. If an item is moved (e.g., due to a physical move in the real world or because it was incorrectly placed), system 500 may automatically update the item's spatial relations and geolocation. If a building space is deleted, system 500 may automatically update the parent space information for any items and/or spaces contained within the deleted building space.

Advantageously, the geometric heuristics used by system 500 to determine relationships between building spaces and the items within building spaces may reduce user errors when configuring the building spaces. Since the spatial and hierarchical relationships generated by system 500 are derived from the locations of the building spaces on the map, the relationships generated by system 500 accurately represent the locations of the building spaces and items as shown in the graphical user interface.

System 500 may be configured to use the relationships between building spaces and the items contained therein to monitor and control the building spaces. For example, an alarm or fault detected for a piece of equipment associated with a building space may be shown in the graphical user interface as an alarm associated with the space. A command or control action can be provided to system 500 as an action for a building space (e.g., lock all doors in a space). System 500 may use the relationships between spaces and items to identify relevant equipment within a building space and provide a control signal to the identified equipment. These and other features of system 500 are described in greater detail below.

Still referring to FIG. 5A, system 500 is shown to include BMS controller 366 and building subsystems 428. BMS controller 366 and building subsystems 428 may include some or all of the components and/or features described with reference to FIGS. 1-4. System 500 is also shown to include a map provider 502 and a floorplan provider 504. Map provider 502 may be a map service or database configured to provide BMS controller 366 with maps (e.g., geographic maps, street maps, city maps, etc.). In some embodiments, map provider 502 is an Internet-based map service such as Open Street Maps or Google Maps. The maps may include geolocation data and may define the geolocations of roads, buildings, bodies of water, land, and/or other manmade or naturally-occurring items that have a fixed geolocation.

Floorplan provider 504 may be a floorplan service or database configured to provide BMS controller 366 with floorplans. In some embodiments, floorplan provider 504 is a user that provides BMS controller 366 with a floorplan by uploading the floorplan from the user's device. In other embodiments, BMS controller 366 obtains floorplans from a third-party data source. Floorplans may be provided in a visual or graphical format (e.g., as pictures, drawings, architectural models, CAD models, etc.) and/or as data files.

Still referring to FIG. 5A, system 500 is shown to include a space creator 520. Space creator 520 may be configured to identify or define building spaces, establish relationships between building spaces, and determine the geolocations of building spaces. In some embodiments, space creator 520 creates objects (e.g., software objects, programming objects, etc.) representing building spaces and stores the objects in a spaces database 512. Throughout this disclosure, the term "building spaces" is used to refer to both the objects created by space creator 520 and the physical spaces represented by such objects. Space creator 520 may assign attributes to each building space identifying the geolocation of the building space, any parent spaces that contain the building space, and/or any child spaces contained within the building space. Space creator 520 may store the attributes and location of each building space in spaces database 512.

Space creator 520 is shown to include a floorplan geolocator 522, a space geolocator 524, and a parent space detector 526. Floorplan geolocator 522 may be configured to identify or define the geolocation of a floorplan and/or a building or floor represented by the floorplan. In other words, floorplan geolocator 522 may establish the location of a floorplan relative to the Earth. In some embodiments, floorplan geolocator 522 generates and provides a graphical user interface for defining the geolocation of a floorplan. An exemplary user interface which may be generated by floorplan geolocator 522 is described in greater detail with reference to FIGS. 6A-7B.

Figure 7A:
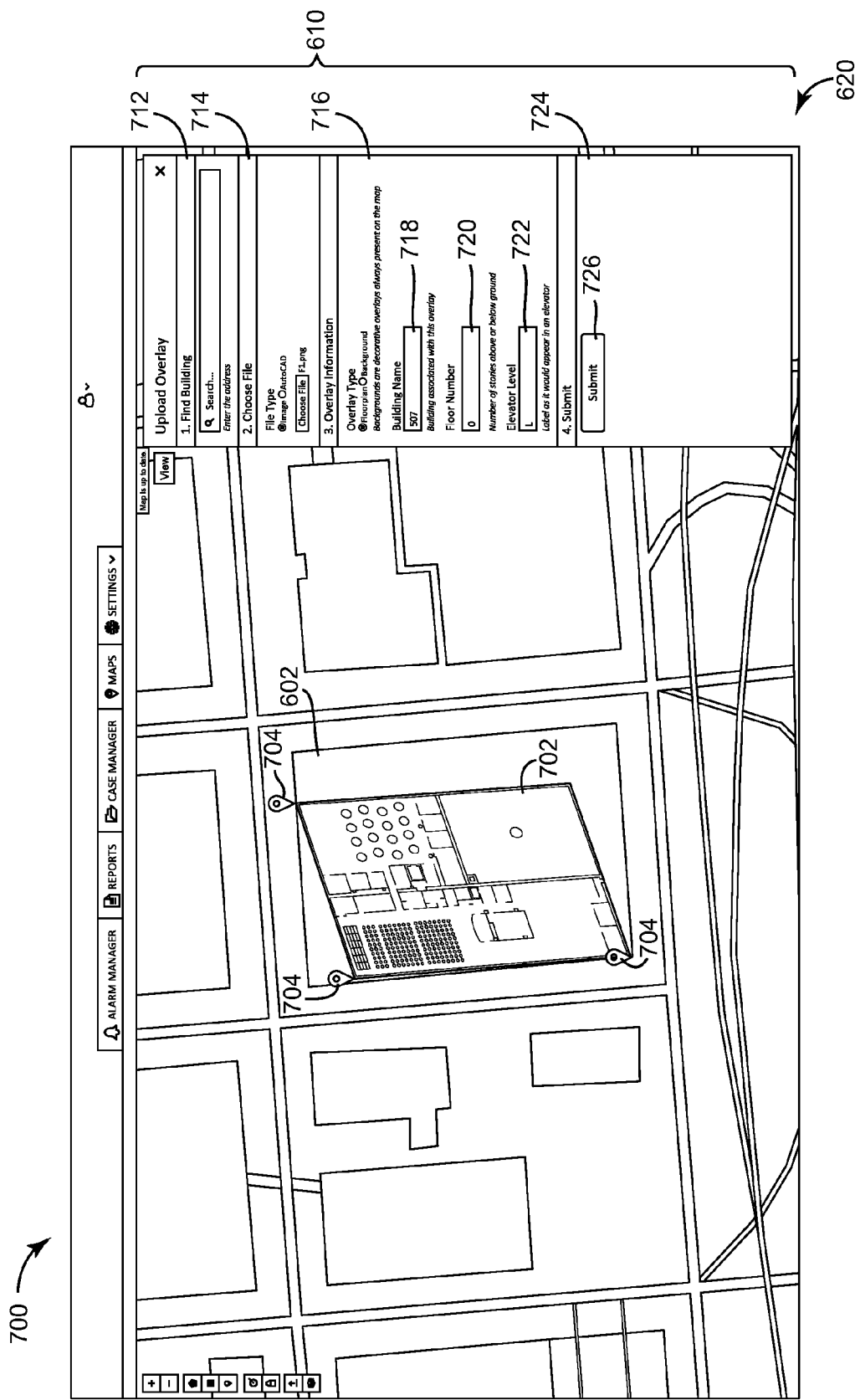
FIGS. 7A-7B are drawings of an upload overlay interface which may be generated by the space creator of FIGS. 5A-5B to facilitate overlaying a building floorplan onto a map, according to an exemplary embodiment.
Figure 7B:
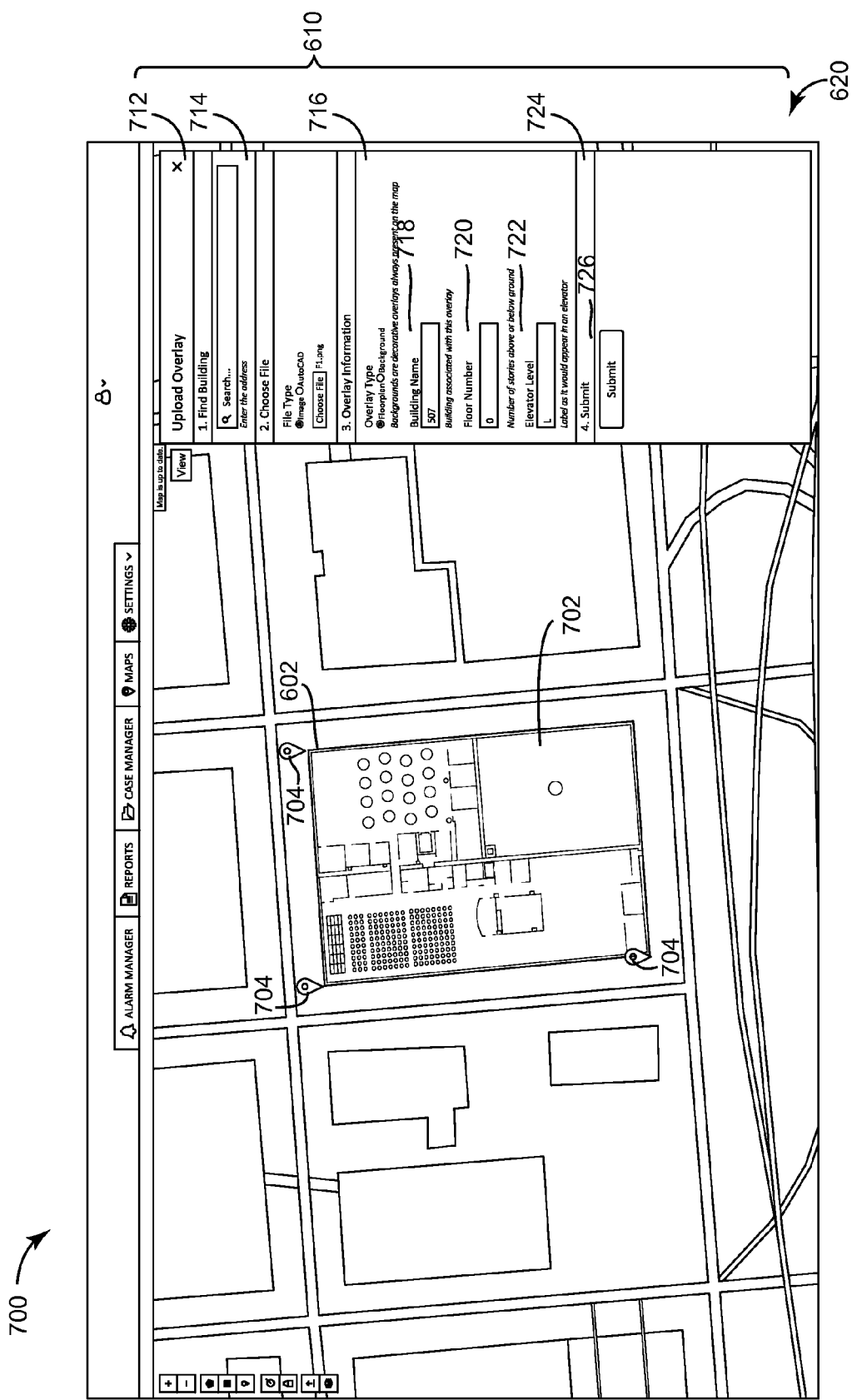

Floorplan geolocator 522 is shown receiving the maps from map provider 502 and the floorplans from floorplan provider 504. Floorplan geolocator 522 may allow a user to view a particular area of the map (e.g., by entering a street address or spatial coordinates, by panning and zooming in, etc.). Floorplan geolocator 522 may prompt a user to select a floorplan. Once a floorplan is selected, floorplan geolocator 522 may overlay the floorplan onto the map. Floorplan geolocator 522 may automatically identify corners of the selected floorplan and may provide user interface options for adjusting the size, location, and/or orientation the floorplan relative to the map. For example, FIGS. 7A-7B illustrate how the corners of the selected floorplan can be moved relative to the map until the geolocation of the floorplan accurately matches the actual geolocation of a building represented by the floorplan.

Floorplan geolocator 522 may create a building space representing the building and a building space representing the particular floor depicted by the floorplan. The building space representing the floor may be created as a subspace within the building space representing the entire building. In some embodiments, floorplan geolocator 522 provides user interface options for naming the building and identifying the floor represented by the floorplan. The floor may be identified by a floor number (e.g., a number relative to the lowest floor in the building) and/or an elevator level (e.g., the floor label as the floor would appear in an elevator). For example, the basement of a building may be identified as floor number "0" and elevator level "B." Floorplan geolocator 522 may determine the geolocation of the created building spaces using the geolocation data provided by the map onto which the floorplan is overlaid. Floorplan geolocator 522 may store the geolocations, sizes, boundaries, and/or other attributes of the created building spaces in spaces database 512.

Space geolocator 524 may be configured to create building spaces within the floorplan and to identify or define the geolocations of the created building spaces. In some embodiments, space geolocator 524 generates and provides a graphical user interface for creating and defining the geolocations of building spaces. An exemplary user interface which may be generated by space geolocator 524 is described in greater detail with reference to FIGS. 8A-8C. In some embodiments, the user interface includes drawing tools that allow a user to draw the borders of a building space. For example, a user can trace a border along one or more walls shown in the floorplan to define the location of a building space relative to the floorplan. Building spaces of any shape or size may be created by drawing any number of line segments (e.g., linear segments, curved segments, freeform segments, etc.) to define the building space. In some embodiments, the drawing tools allow a user to insert a variety of geometric shapes (e.g., rectangles, circles, parallelograms, etc.) and adjust the geometric shapes (e.g., resize, reposition, reorient, etc.) to define building spaces. Space geolocator 524 may determine the geolocation of the created building spaces using the geolocation data provided by the map onto which the floorplan is overlaid. Space geolocator 524 may store the geolocations, sizes, boundaries, and/or other attributes of the created building spaces in spaces database 512.

Parent space detector 526 may be configured to determine and/or establish relationships between building spaces. For each of the building spaces, parent space detector 526 may determine whether the building space is contained within any other building spaces and whether the building space contains any other building spaces. For example, if a first building space is contained within a second (larger) building space, parent space detector 526 may identify the second building space as a parent of the first building space. In some embodiments, parent space detector 526 identifies the smallest building space (if any) that contains the first building space as the parent (e.g., the immediate parent) to the first building space. Conversely, if a first building space contains a second (smaller) building space, parent space detector 526 may identify the second building space as a child of the first building space. A building space may have any number of child spaces contained therein.

Parent space detector 526 may use geometric heuristics to automatically identify relationships between building spaces. For example, parent space detector 526 may determine the area a and centroid l (i.e., the geometric center) for each of the building spaces based on the size and shape of the building space drawn on the floorplan. To determine the parent space of a given building space, parent space detector 526 may identify all of the building spaces that both contain the centroid of the given building space and have an area greater than the area of the given building space. Parent space detector 526 may then select the identified building space with the smallest area as the parent of the given building space. In other words, parent space detector 526 may detect the parent to a building space B as follows:
  Let a be the area of space B
  Let l be the centroid of space B
  Find the smallest existing space P which contains l and has an area larger than a
  Set space P as the detected parent of space B In some embodiments, parent space detector 526 assigns each new building space a parent space attribute. Parent space detector 526 may cause the detected parent space to be provided (e.g., via a user interface) as a recommended value for the parent space attribute. A user can confirm that the detected parent space is correct or change the parent space attribute to a different (e.g., user-defined) parent space. Parent space detector 526 may store the parent space attribute along with the locations and other attributes of the building spaces in spaces database 512. Other attributes may include, for example, a user-defined name of the building space (e.g., Office A, Conference Room B, etc.) and a category of the building space (e.g., room, closet, laboratory, office, stairwell, etc.).

In some embodiments, parent space detector 526 classifies each building space as a floor-level space or a building-level space. Floor-level spaces may include building spaces that exist within a single floor of the building. In some embodiments, parent space detector 526 identifies a floor of the building that contains each new floor-level space. If the floor-level space is not contained within any other building spaces within the floor, parent space detector 526 may identify the building space representing the floor (e.g., "Floor 4") as the parent for the floor-level space. However, if the floor-level space is contained within another building space within the floor (i.e., a building space smaller than the building space representing the entire floor), parent space detector 526 may use the geometric heuristic outlined above to identify the smallest containing space as the parent for the floor-level space.

Building-level spaces may include spaces that span multiple floors and do not have any single floor as a parent space (e.g., elevator shafts, stairwells, etc.). Parent space detector 526 may automatically detect building-level spaces and recommend the building space representing the entire building as the parent for the building-level space. In some embodiments, parent space detector 526 determines whether a building space is a floor-level space or a building-level space based on the category of the building space. For example, if the user selects a building-level space category (e.g., stairwell, elevator shaft, etc.) via the space creation interface, parent space detector 526 may classify the building space as a building-level space. However, if the user selects a floor-level space category (e.g., room, closet, utility, office, etc.), parent space detector 526 may classify the building space as a floor-level space.

Still referring to FIG. 5A, system 500 is shown to include an equipment creator 530. Equipment creator 530 may be configured to identify and/or define the geolocations of building equipment and establish relationships between building equipment and building spaces. In some embodiments, equipment creator 530 creates items (e.g., software objects, programming objects, etc.) representing the building equipment and stores the items in an items database 514. Equipment creator 530 may assign attributes to each item identifying the geolocation of the corresponding building equipment and/or any parent spaces that contain the building equipment. Equipment creator 530 may store the attributes and location of each item in items database 514.

Equipment creator 530 is shown to include an equipment geolocator 532 and a parent space detector 536. Equipment geolocator 532 may be configured to identify or define the geolocation of building equipment. In other words, equipment geolocator 532 may establish the location of the equipment relative to the Earth. In some embodiments, equipment geolocator 532 generates and provides a graphical user interface for defining the geolocations of the building equipment. An exemplary user interface which may be generated by equipment geolocator 532 is described in greater detail with reference to FIGS. 9A-9C.

Equipment geolocator 532 may receive the map with the overlaid floorplan from space creator 520. In some embodiments, the user interface generated by equipment geolocator 532 includes tools that allow a user to specify the locations of the building equipment relative to the floorplan. For example, a user can select a type of equipment from a menu or listing of different equipment types (e.g., cabinets, cameras, counters, controllers, etc.) provided via the user interface. The user can place an icon or marker representing the selected type of equipment at a particular location on the overlaid floorplan to specify the location of the building equipment. Once the location of the building equipment relative to the floorplan has been identified, equipment geolocator 532 may use the geolocation data provided by the map to determine the geolocation of the building equipment.

Parent space detector 536 may be configured to determine and/or establish relationships between building equipment and building spaces. For example, parent space detector 536 may identify a parent building space for each item of building equipment added to the floorplan. Items may be contained within one of more of the building spaces generated by space creator 520 (e.g., sensors or thermostats located within a room of the building) or located outside of the building spaces (e.g., a camera located outside the building). Parent space detector 536 may receive the locations and other attributes of the building spaces from spaces database 512. Parent space detector 536 may use the locations of the building spaces to determine whether any of the building spaces contain the added item. In some embodiments, parent space detector 536 identifies the smallest building space (if any) that contains the item as the parent space of the item.

Parent space detector 536 may use geometric heuristics to automatically identify relationships between items and building spaces. For example, parent space detector 536 may identify the location l for each item of building equipment. To determine the parent space for the item, parent space detector 536 may identify all of the building spaces that contain the location l. Parent space detector 536 may then select the identified building space with the smallest area as the parent of the item. In other words, parent space detector 536 may detect the parent space of an item of building equipment as follows:

Let l be the location of equipment E

Find the smallest existing space P which contains l

Set space P as the detected parent of equipment E

In some embodiments, parent space detector 536 assigns each new building equipment item a parent space attribute. Parent space detector 536 may cause the detected parent space to be provided (e.g., via a user interface) as a recommended value for the parent space attribute. A user can confirm that the detected parent space is correct or change the parent space attribute to a different (e.g., user-defined) parent space. Parent space detector 536 may store the parent space attribute along with the location and other attributes of the building equipment item in items database 514. Other attributes may include, for example, a user-defined name of the item (e.g., Camera A, Chiller B, etc.) and a type of item (e.g., cabinet, camera, counter, controller, etc.).

In some embodiments, parent space detector 536 identifies a grandparent building space for each item of building equipment. The grandparent building space for an item may be defined as the parent building space of the item's parent. In some embodiments, parent space detector 536 detects the grandparent building space by identifying the parent building space for the item and extracting the parent space attribute from the identified parent building space. Parent space detector 536 may then apply the extracted attribute as a grandparent space attribute for the item. In other embodiments, parent space detector 536 uses geometric heuristics to identify the grandparent building space. For example, parent space detector 536 may identify the grandparent building space as follows:

Let l be the location of equipment E

Find the second smallest existing space G which contains l

Set space G as the detected grandparent of equipment E

Still referring to FIG. 5A, system 500 is shown to include a door creator 540. Door creator 540 may be configured to identify and/or define the geolocations of doors and establish relationships between doors and building spaces. Doors are a type of item that connects two building spaces. In some embodiments, door creator 540 may be combined with equipment creator 530 to form an item creator that can create both building equipment items and door items. In other embodiments, door creator 540 and equipment creator 530 are separate, as shown in FIG. 5A. In some embodiments, door creator 540 creates items (e.g., software objects, programming objects, etc.) representing the doors and stores the items in items database 514. Door creator 540 may assign attributes to each door item identifying the geolocation of the corresponding door and/or any building spaces linked by the door. Door creator 540 may store the attributes and location of each door item in items database 514.

Door creator 540 is shown to include a door geolocator 542 and a connected spaces detector 546. Door geolocator 542 may be configured to identify or define the geolocations of doors. In other words, door geolocator 542 may establish the location of the doors relative to the Earth. In some embodiments, door geolocator 542 generates and provides a graphical user interface for defining the geolocations of the doors. An exemplary user interface which may be generated by door geolocator 542 is described in greater detail with reference to FIG. 10.

Door geolocator 542 may receive the map with the overlaid floorplan from space creator 520. In some embodiments, the user interface generated by door geolocator 542 includes tools that allow a user to specify a location of a door relative to the floorplan. For example, a user can select a door item from a list of items provided via the user interface. The user can place an icon or marker representing the door item at a particular location on the overlaid floorplan to specify the location of the door. Once the location of the door relative to the floorplan has been identified, door geolocator 542 may use the geolocation data provided by the map to determine the geolocation of the door.

Connected spaces detector 546 may be configured to determine and/or establish relationships between door items and building spaces. Door items may be contained within one of more of the building spaces generated by space creator 520 (e.g., along a boundary of the building space). Connected spaces detector 546 may identify a parent building space for each door item added to the floorplan. The parent building space for a door item may be determined in the same way that the parent building space for an equipment item is determined. For example, connected spaces detector 546 may receive the locations and other attributes of the building spaces from spaces database 512. Connected spaces detector 546 may use the locations of the building spaces to determine whether any of the building spaces contain the door item. In some embodiments, connected spaces detector 546 identifies the smallest building space that contains the door item as the parent space of the door item.

In some instances, a door connects the parent building space to the grandparent building space. For example, a door connecting a room to a hallway may connect the parent building space (i.e., the room) to the grandparent building space (i.e., the floor). In other instances, a door may connect the parent building space to another building space within the grandparent building space (e.g., another room adjacent to the parent building space) or to an area that is not defined as a building space (e.g., an outside of the building).

Connected spaces detector 546 may use geometric heuristics to automatically identify building spaces connected by the door item. For example, connected spaces detector 546 may identify the location l, the parent building space P, and the grandparent building space G of the door item, as previously described. Connected spaces detector 546 may determine whether any of the building spaces other than the parent building space P and the grandparent building space G have a boundary within a predetermined distance of the location l (e.g., within one meter). If any such building spaces exist, connected spaces detector 546 may identify which of those building spaces has the closest boundary to the location l. Connected spaces detector 546 may then set the identified building space X as a connected building space for the door item. If the parent building space P is not defined, connected spaces detector 546 may set the identified building space X and the space with the next closest boundary as the connected spaces for the door item. If no existing building spaces other than the parent building space P and the grandparent building space G have a boundary within the predetermined distance of the location l, connected spaces detector 546 may set the grandparent building space G as a connected building space for the door item.

In some embodiments, connected spaces detector 546 detects the connected spaces for a door item using the following heuristic:

Let l be the location of door D
Let P be the parent space for door D
Let G be the grandparent space for door D
Find the building space X with the closest boundary b to l subject to the constraints:
X is not P
X is not G
The minimum distance between b and l must be less than a threshold
If space X is defined, set spaces X and P as the detected connected spaces for door D
Else if space P is not defined, set space X and the space with the next closest boundary as the connected spaces for door D
Else, set spaces P and G as the detected connected spaces for door D Advantageously, this heuristic may be used to accurately and automatically detect the spaces connected by a door item, even if the door item is not placed within a parent building space. For example, if a door item is placed between two building spaces separated from each other by a small distance, the above heuristic may identify the two closely-located building spaces as the connected spaces for the door item.

In some embodiments, connected spaces detector 546 assigns each new building equipment item a connected spaces attribute. Connected spaces detector 546 may cause the detected connected spaces to be provided (e.g., via a user interface) as a recommended value for the connected spaces attribute. A user can confirm that the detected connected spaces are correct or change the connected spaces attribute to a different (e.g., user-defined) set of spaces. Connected spaces detector 546 may store the connected spaces attribute along with the location and other attributes of the door item in items database 514.

As previously described, space creator 520 may generate and define the attributes of the building space objects stored in spaces database 512. Each building space object may include attributes defining the boundaries of the building space and the location of the geometric center of the building space. The locations of the boundaries and the geometric center may be defined relative to a floorplan and/or relative to a map that provides geolocation data. Each building space object may include a parent space attribute and/or a grandparent space attribute defining the parent space and/or the grandparent space (if any) of the building space. In some embodiments, each building space object includes an attribute defining the type of building space (e.g., room, office, floor, stairwell, laboratory, floor-level, building level, etc.) and an attribute defining the name of the building space.

In some embodiments, each building space object includes a child space attribute defining child spaces (if any) contained within the building space. Each building space object may include a child items attribute defining any items (e.g., building equipment, doors, etc.) contained within the building space. Items may be identified by a reference to a corresponding item stored in items database 514. In some embodiments, each building space attribute includes an alarms attribute identifying any alarms or faults associated with the building space. Alarms or faults identified by the alarms attribute may be propagated from the items contained within the building space. For example, if an equipment item (e.g., a chiller) is reporting an alarm, the alarm may be propagated upward to the parent building space object and displayed as an attribute of the building space.

Equipment creator 530 and door creator 540 may generate and define the attributes of the building equipment items and the door items stored in items database 514. Each item may include attributes defining the location of the item. The item locations may be defined relative to a floorplan and/or relative to a map that provides geolocation data. Each item may include a parent space attribute and/or a grandparent space attribute defining the parent space and/or the grandparent space (if any) of the item. If the item is a door item, the attributes may include a connected spaces attribute defining the building spaces connected by the door. Building spaces may be identified by a reference to a corresponding building space object in spaces database 512.

Still referring to FIG. 5A, system 500 is shown to include a space controller 506, an alarm manager 508, and a user interface 510. User interface 510 may include, for example, an electronic display, a keyboard, a touchscreen display, or any other type of device configured to receive input from a user or provide an output to a user. In some embodiments, user interface 510 includes hardware components integrated with BMS controller 366. In other embodiments, user interface 510 is a component of another system or device (e.g., a client device, a remote workstation, a mobile device, etc.) that communicates with BMS controller 366 directly or via a communications network. User interface 510 may be configured to present the graphical user interfaces generated by space creator 520, equipment creator 530, door creator 540, and alarm manager 508, and may receive input from a user via the graphical user interfaces.

Alarm manager 508 may be configured to manage and display any alarms (e.g., alerts, faults, notifications, details of interest, etc.) associated with the building spaces and/or the equipment contained therein. In some embodiments, alarm manager 508 communicates with building subsystems 428 and monitors the status of the building equipment. Alarm manager 508 may be configured to identify any alarms reported by the building equipment. In some embodiments, alarm manager 508 receives input from fault detection and diagnostics (FDD) layer 416. Alarm manager 508 may be configured to identify any faults detected by FDD layer 416 as well as the building equipment associated with the fault. In some embodiments, alarm manager 508 automatically determines whether the suppress the fault (i.e., not present the fault to a user) or generate an alarm notifying a user of the fault.

Alarms may be associated with building equipment and/or the spaces that contain such building equipment. In some embodiments, alarm manager 508 receives the item/space associations from items database 514 and identifies a parent building space for building equipment that is reporting an alarm. Alarm manager 508 may present the alarm as an alarm for the building equipment and/or as an alarm for the parent building space.

Alarm manager 508 may generate a graphical user interface for monitoring and responding to any alarms in the building management system. An exemplary alarm interface which may be generated by alarm manager 508 is described in greater detail with reference to FIGS. 12-14C. In some embodiments, the alarm interface includes a map with the locations of one or more building spaces marked on the map. The map with the building spaces may be the same or similar to the overlaid map generated by space creator 520. Building spaces marked on the map may include, for example, buildings, floors, rooms, or any other space created by space creator 520. The map may also identify the locations of building equipment, doors, and/or other items, as may be defined by equipment creator 530 and/or door creator 540.

Alarm manager 508 may present an alarm for an item or for a building space by highlighting or otherwise altering the appearance of the corresponding item or building space shown on the map. For example, alarm manager 508 may present an alarm for a building space by changing a color of the building space (e.g., to red) on the map or displaying an alarm icon (e.g., an exclamation mark) over the building space. Alarm manager 508 may present an alarm for an item of building equipment by changing a color associated with the corresponding item shown on the map and/or causing the item to flash to attract a user's attention.

The alarm interface generated by alarm manager 508 may provide user interface options for viewing the details of an alarm. For example, a user can select an item or space associated with an alarm via the alarm interface to view the details of the alarm (e.g., equipment fault, security breach, etc.). In some embodiments, the alarm interface allows a user to enter notes or comments for an alarm which can be viewed by other users when the alarm is investigated. If the building space associated with the alarm includes a camera, the alarm interface may allow a user to view live video from the camera to investigate the alarm. An alarm can be cleared by providing a user input acknowledging the alarm via the alarm interface.

The alarm interface may provide user interface options for responding to alarms. Responding to an alarm may include performing a control action in response to the alarm. For example, if the alarm is a security breach within a particular building space, responding to the alarm may include locking all of the doors associated with the building space (e.g., connected to the building space) to prevent further intrusion. In some embodiments, alarm manager 508 receives a user input via the alarm interface indicating a desired control action for responding to an alarm. In other embodiments, alarm manager 508 automatically initiates control actions in response to an alarm without requiring a user input.

Control actions may include control actions for individual items (e.g., doors, building equipment, etc.) or as control actions for a building space. Control actions for individual items of building equipment may include, for example, activating or deactivating the building equipment, changing a setpoint for the building equipment, adjusting a mode of operation of the building equipment, and/or otherwise changing a state of the building equipment. Control actions for doors may include opening, closing, locking, or unlocking the doors. Control actions for a building space may include changing a setpoint for the building space (e.g., a temperature setpoint) or changing a security state for the building space. Alarm manager 508 may interact with space controller 506 to cause the control actions to be performed.

Space controller 506 may be configured to facilitate spatial control within a building. For example, space controller 506 is shown receiving a space control signal from alarm manager 508. The space control signal may include one or more control actions to be applied to a specified building space. For example, the space control signal may include a command to lock all of the doors associated with a building space. Space controller 506 may receive the item/space associations from items database 514 and use the item/space associations to identify the building equipment, doors, and other items associated with the building space. Space controller 506 may use the item/space associations to translate a space control signal into individual control signals for the items within the building space. For example, if the space control signal includes a command to lock all of the doors associated with a building space, space controller 506 may use the item/space associations to identify the doors that list the building space as one of the connected spaces. Space controller 506 may then generate individual control signals for each of the identified doors, causing the doors to lock.

Space controller 506 may communicate with building subsystems 428 via BMS interface 409. For example, space controller 506 may receive equipment status signals, measurements from sensors, or other inputs that can be used by space controller 506 to monitor the status of the building equipment and/or the conditions within the building spaces. Space controller 506 may use any of a variety of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to generate control signals for building subsystems 428 and may provide the control signals to building subsystems 428 via BMS interface 409.

Referring now to FIG. 5B, another system 550 for configuring and controlling building spaces is shown, according to an exemplary embodiment. System 550 is shown to include many of the same components as system 500, as described with reference to FIG. 5A. However, many of the components previously described as components of BMS controller 336 are shown in FIG. 5B as components of a client device 552. For example, space creator 520, equipment creator 530, door creator 540, user interface 510, and alarm manager 508 may be components of a client device 552 separate from BMS controller 366.

Client device 552 may include a desktop computer, a laptop computer, a remote workstation, a tablet, a smartphone, or any other type of user-operable computing device. Client device 552 may be a mobile device or a non-mobile device. In some embodiments, client device 552 runs a program or load a web interface that allows the functions of space creator 520, equipment creator 530, door creator 540, user interface 510, and alarm manager 508 to be performed by client device 552 (e.g., by a processor or processing circuit of client device 552). For example, instructions for performing the functions of these components may be provided to client device 552 in the form of computer-executable code (e.g., HTML code, program code, etc.). The computer-executable code may be stored in memory within client device 552 and/or used by client device 552 (e.g., a program or web browser running on client device 552) to perform one or more of the functions or processes described herein.

In various embodiments, spaces database 512 and items database 514 may be components of BMS controller 366, components of client device 552 (e.g., stored in local memory of client device 552), or external databases separate from both client device 552 and BMS controller 366. Similarly, space controller 506 may be a component of client device 552 or a component of BMS controller 366. It is contemplated that any or all of the components shown in FIGS. 5A-5B may be components of BMS controller 366, client device 552, a remote server, a cloud-based computing system, any other system or device that can be accessed by a user, and/or any combination thereof. Advantageously, locating the components of systems 500-550 across multiple devices may allow for greater versatility by enabling various combinations of devices to perform the functions and processes described herein.

Graphical User Interfaces

Figure 8A:
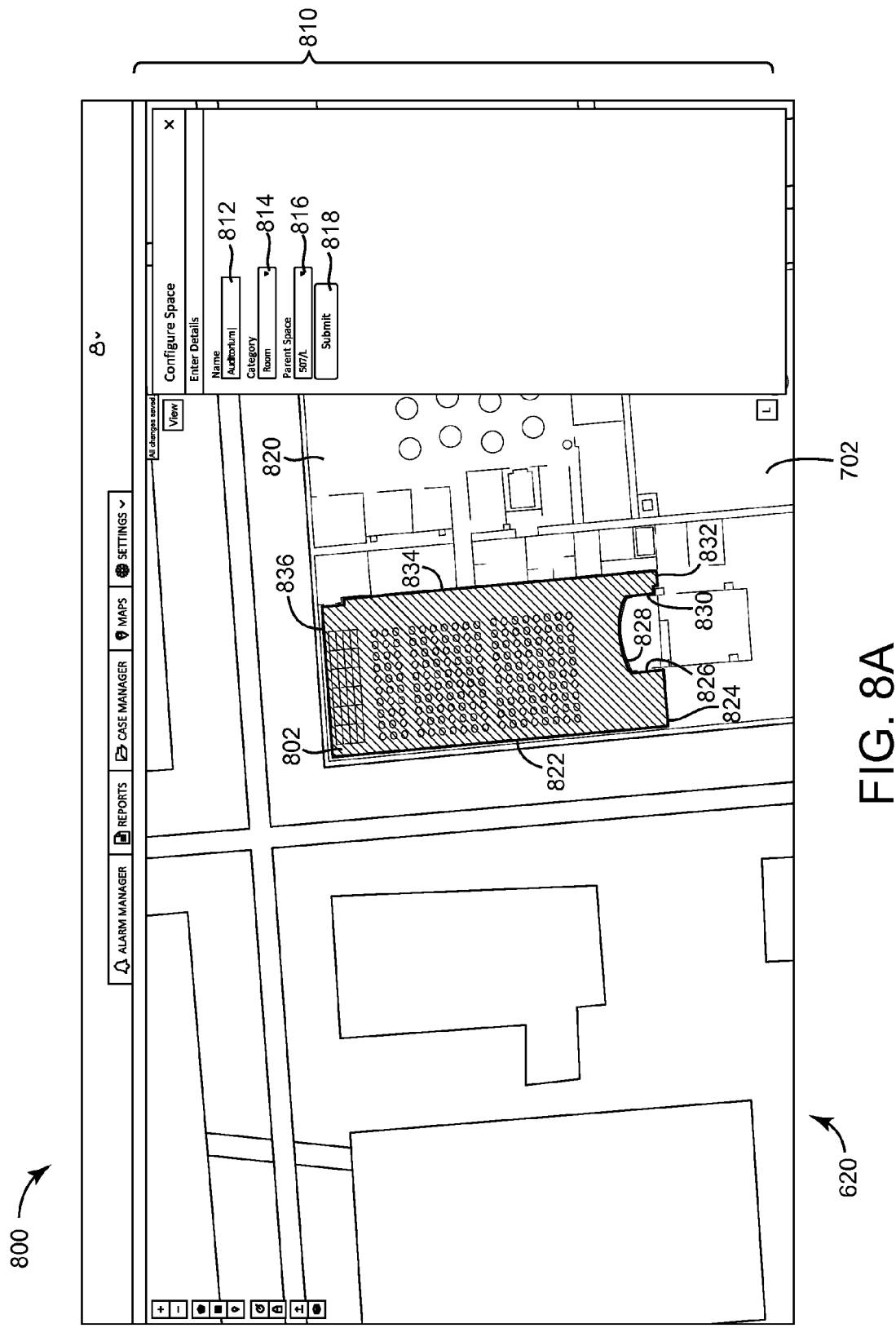
FIGS. 8A-8C are drawings of a space configuration interface which may be generated by the space creator of FIGS. 5A-5B to establish the geolocations of building spaces and to associate the building spaces with other building spaces, according to an exemplary embodiment.
Figure 8B:
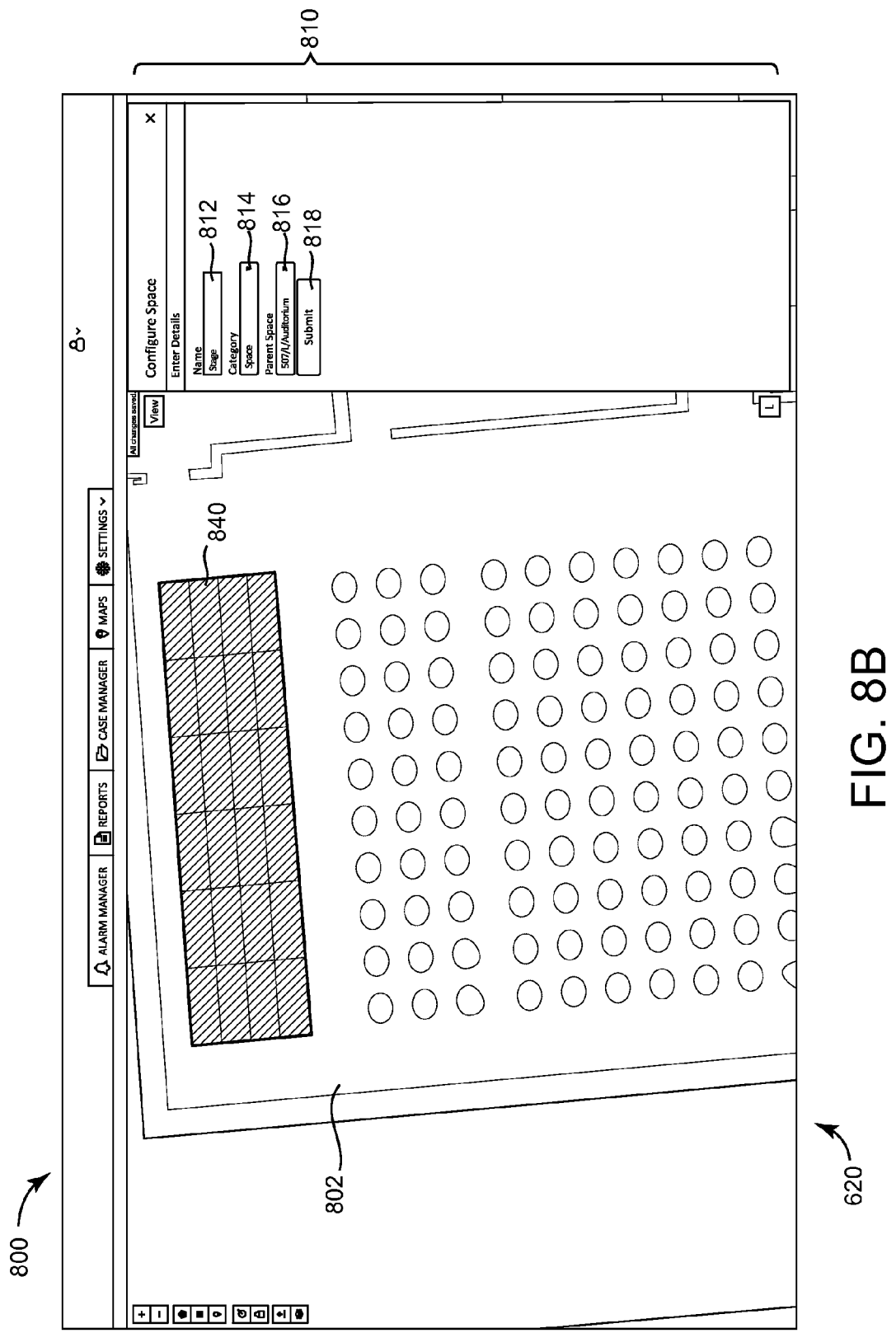
Figure 8C:
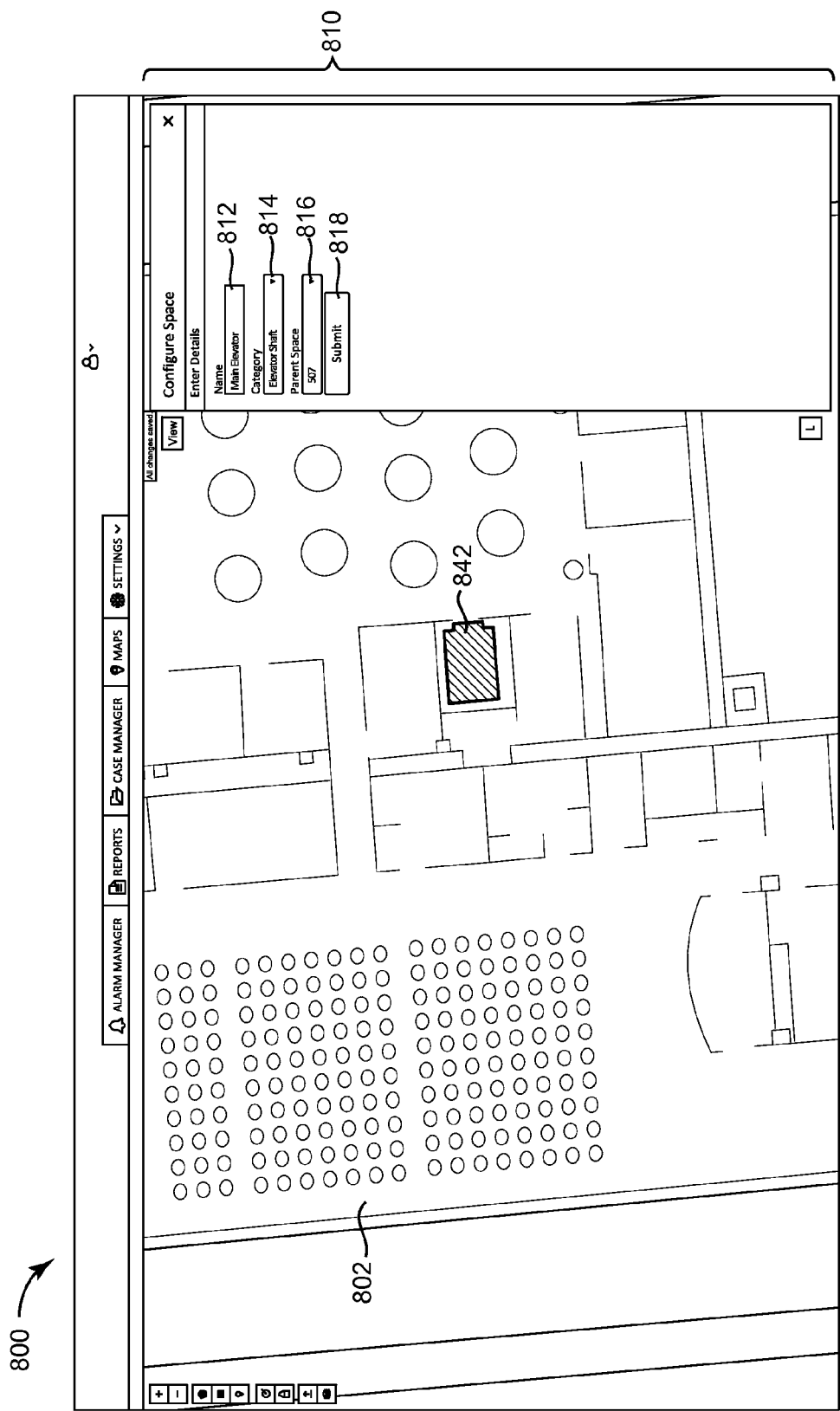
Figure 9A:
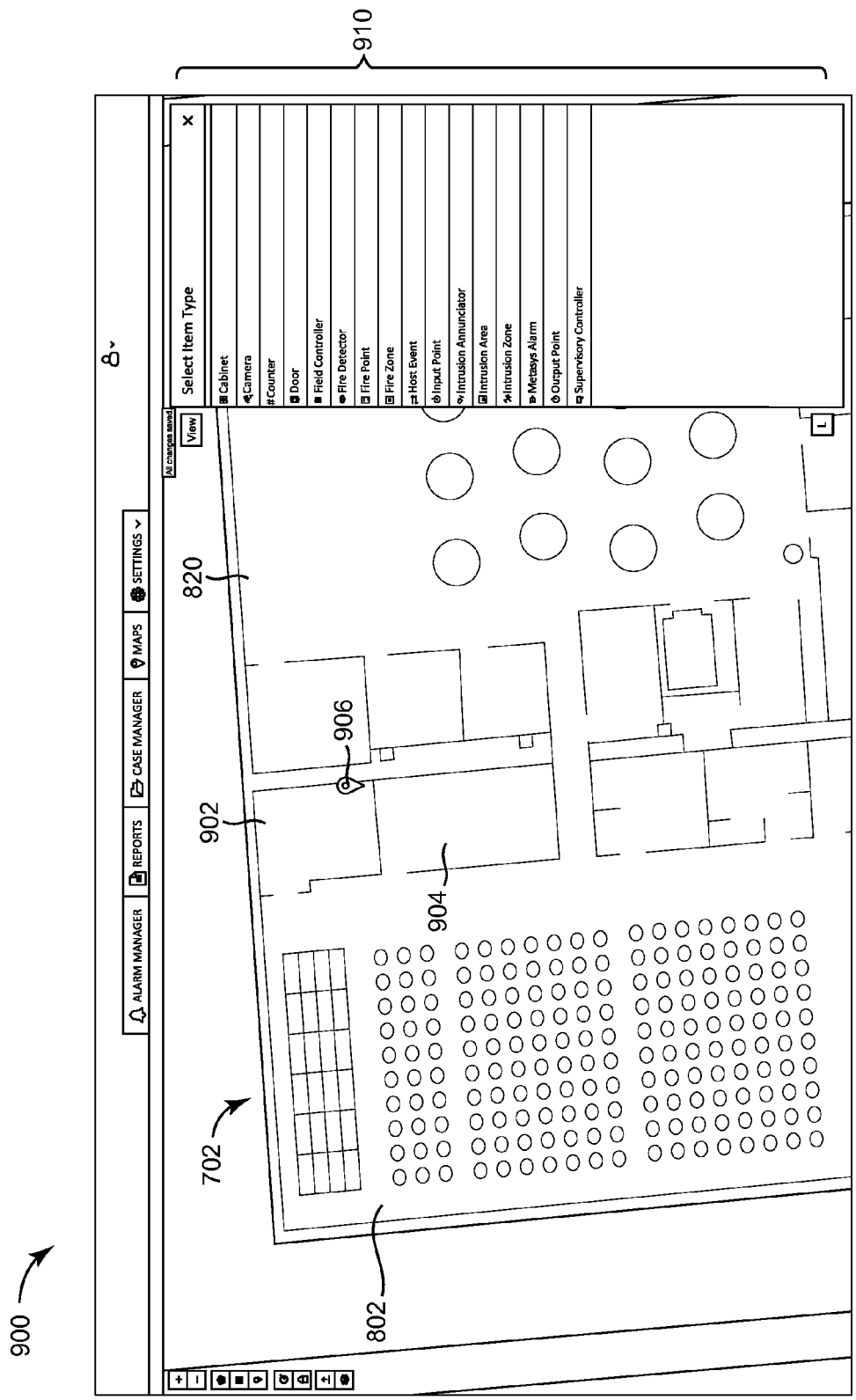
FIGS. 9A-9C are drawings of an equipment creation interface which may be generated by the equipment creator of FIGS. 5A-5B to establish the geolocations of building equipment and to associate the building equipment with building spaces, according to an exemplary embodiment.
Figure 9B:
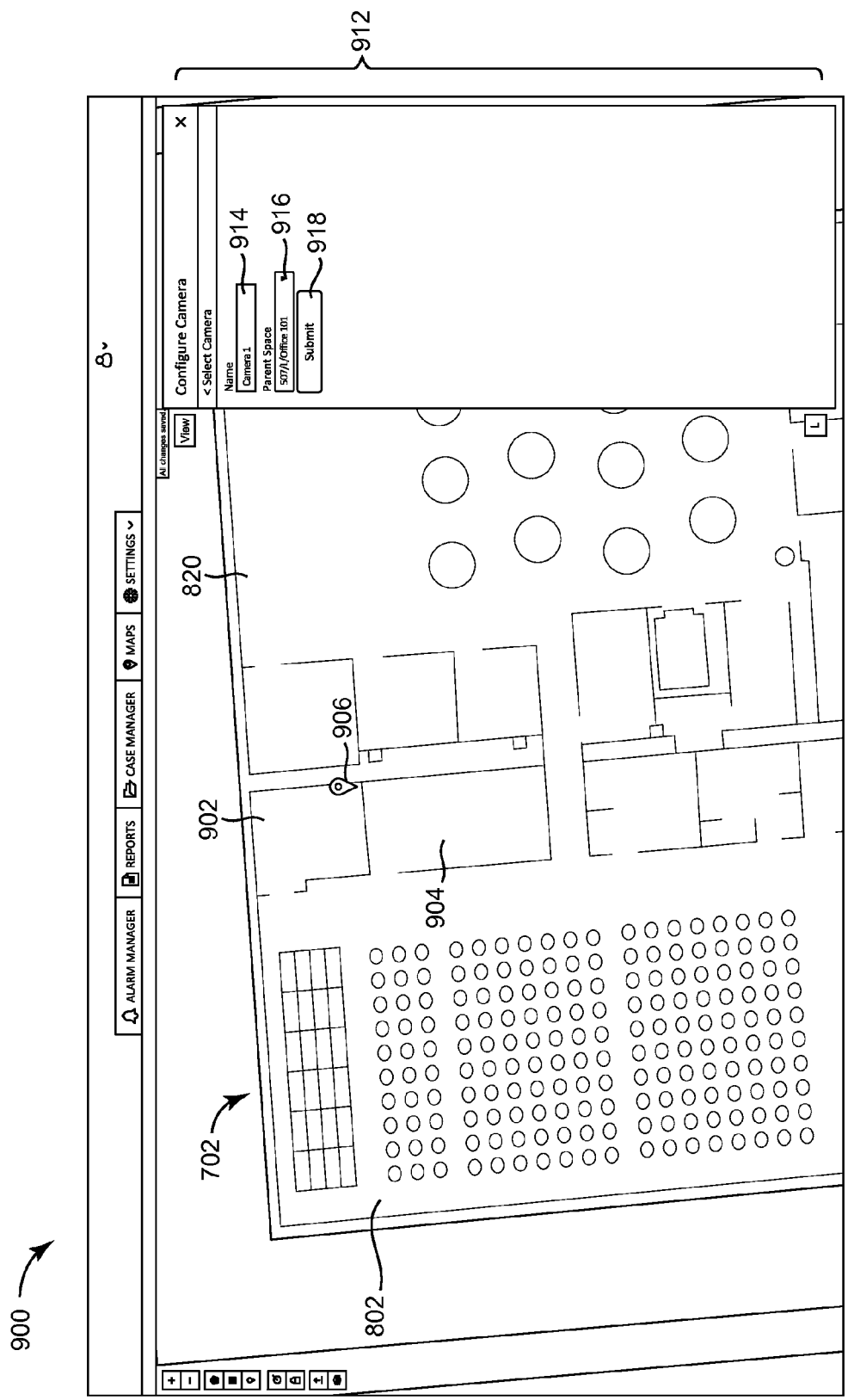
Figure 9C:
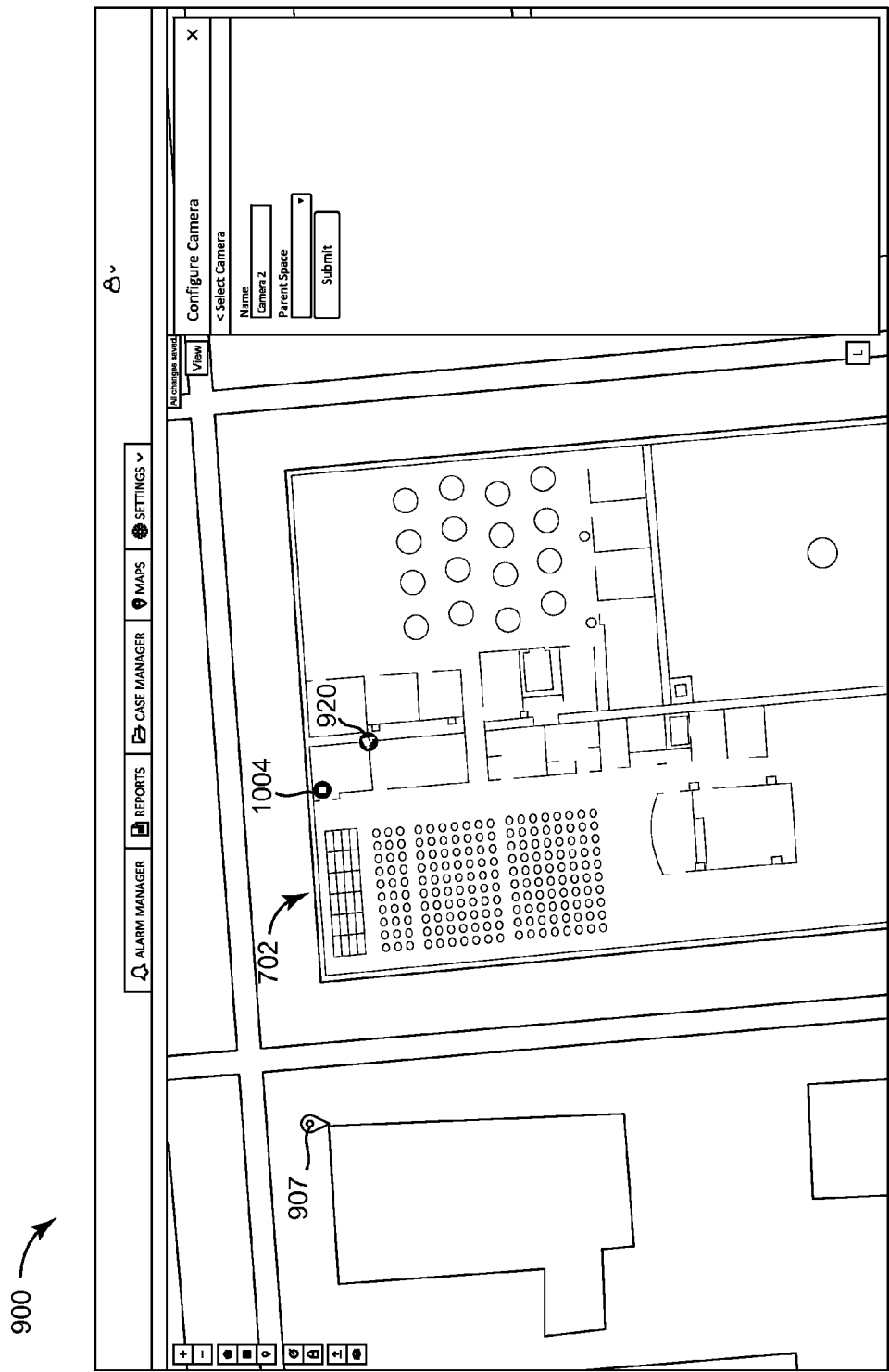
Figure 10:
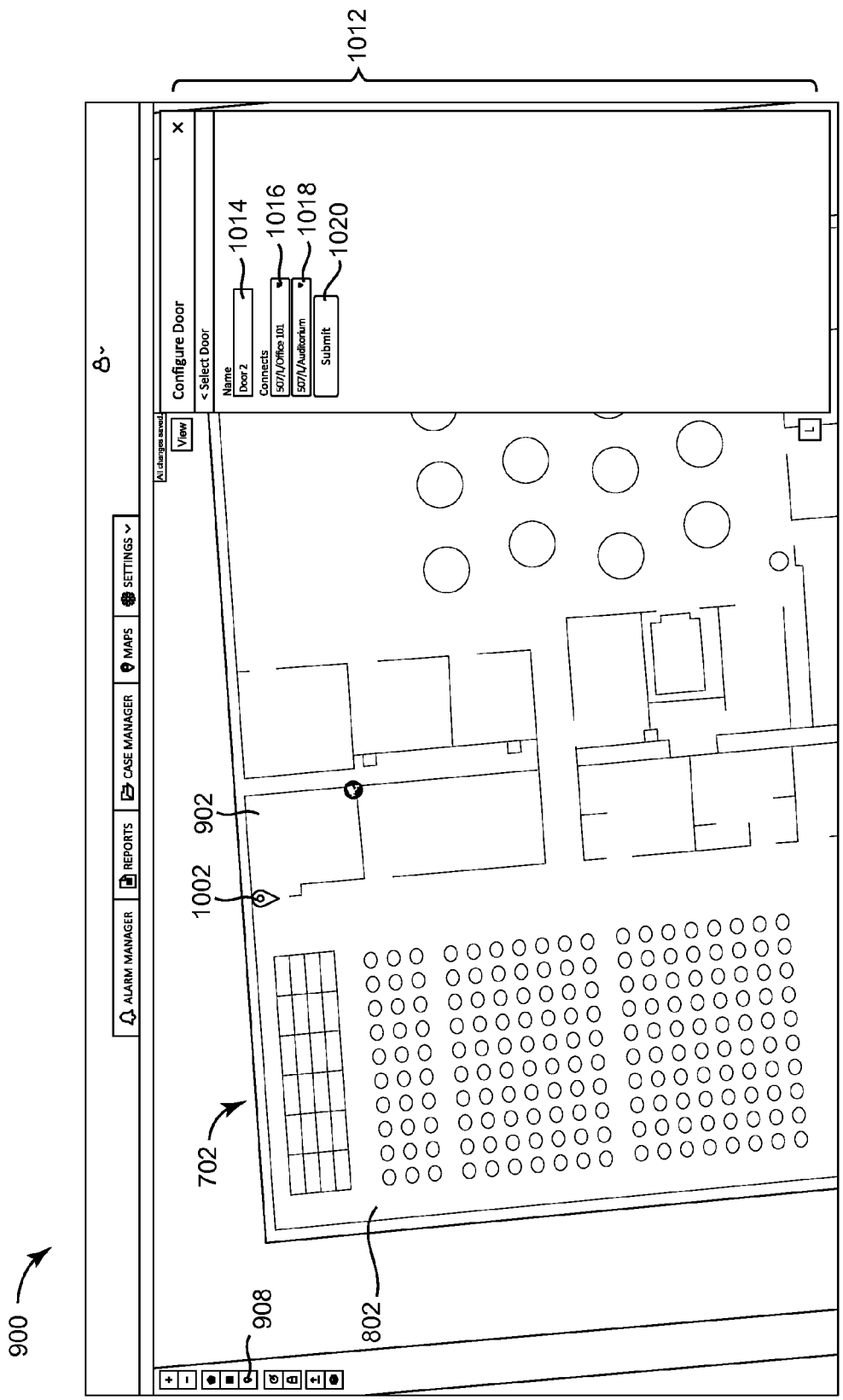
FIG. 10 is a drawing of a door creation interface which may be generated by the door creator of FIGS. 5A-5B to establish the geolocations of doors and to associate the doors with building spaces, according to an exemplary embodiment.

Referring now to FIGS. 6A-14C, several graphical user interfaces (GUIs) which may be generated by BMS controller 366 are shown, according to an exemplary embodiment. In brief overview, FIGS. 6A-8C illustrate GUIs which may be generated by space creator 520 to establish the geolocations of building spaces and to associate building spaces with other building spaces. FIGS. 9A-9C illustrate GUIs which may be generated by equipment creator 530 to establish the geolocations of building equipment and to associate the building equipment with building spaces. FIG. 10 illustrates a GUI which may be generated by door creator 540 to establish the geolocations of doors and to associate the doors with building spaces. FIGS. 11A-11B illustrate GUIs which may be used to delete building spaces and/or change the geolocations of items within the building spaces. FIGS. 12-14C illustrate GUIs which may be generated by alarm manager 508 to view and respond to alarms associated with building equipment and/or building spaces.

The GUIs may be presented via user interface 510 or via a separate client device and may be used to facilitate user interaction with BMS controller 366. In some embodiments, the GUIs are web interfaces that can be rendered and presented using a web browser application running on a client device. In other embodiments, the GUIs are presented via a specialized application for monitoring and controlling building spaces installed on the client device. The GUIs may present information to a user and may receive input from a user. User input received via the GUIs may be used by BMS controller 366 to define the geolocations of building spaces and items within the building spaces (e.g., building equipment, doors, etc.) and to establish relationships between building spaces and the items contained therein. User input received via the GUIs may also be used by BMS controller 366 to generate and provide control signals to building subsystems 428.

Referring particularly to FIGS. 6A-8C, several GUIs 600-800 which may be generated by space creator 520 are shown, according to an exemplary embodiment. GUIs 600-800 may be used to establish the geolocations of building spaces and to associate building spaces with other building spaces.

Figure 6A:
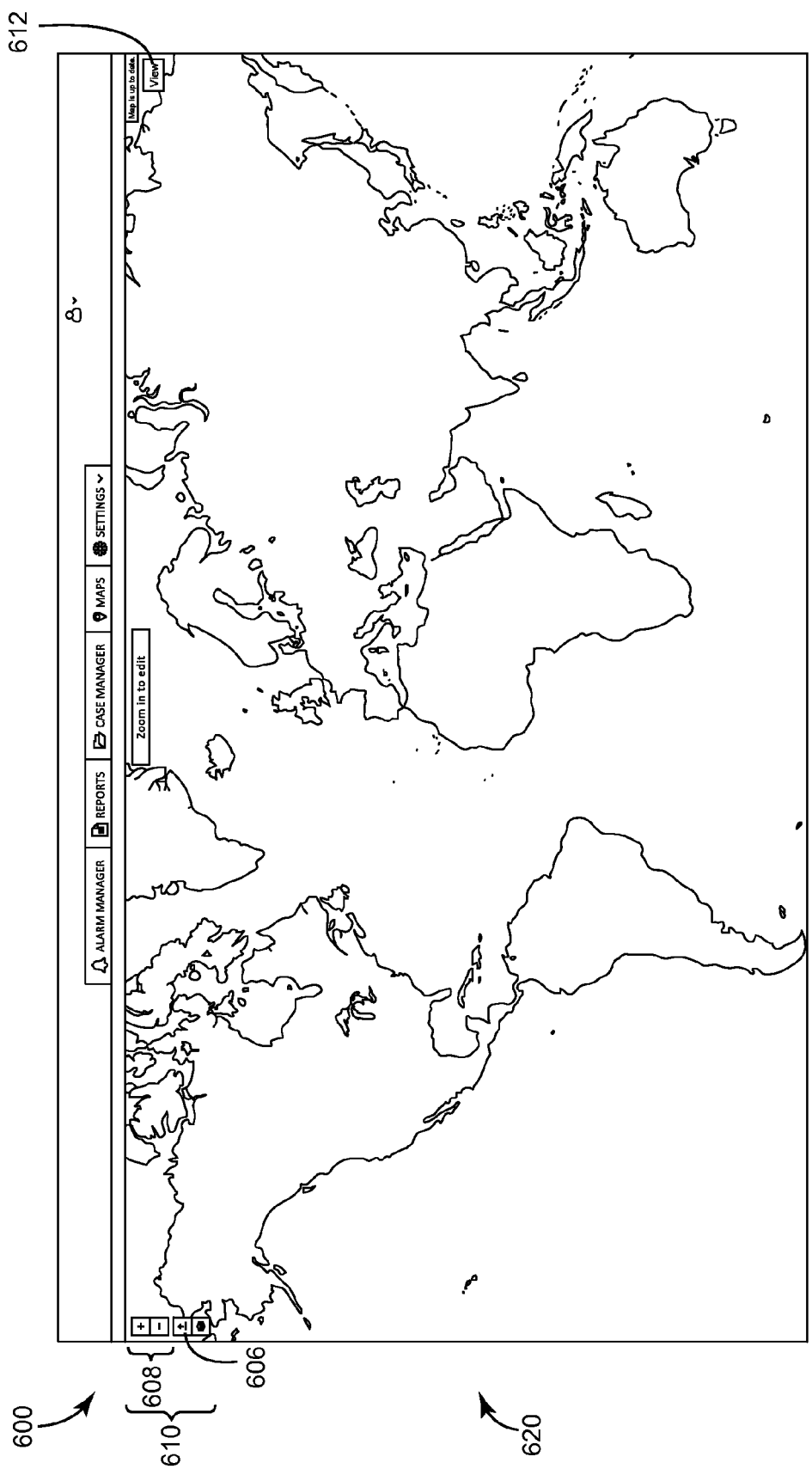
FIGS. 6A-6B are drawings of a map interface which may be generated by the space creator of FIGS. 5A-5B to display a map indicating the geolocations of building spaces and the items contained therein, according to an exemplary embodiment.
Figure 6B:
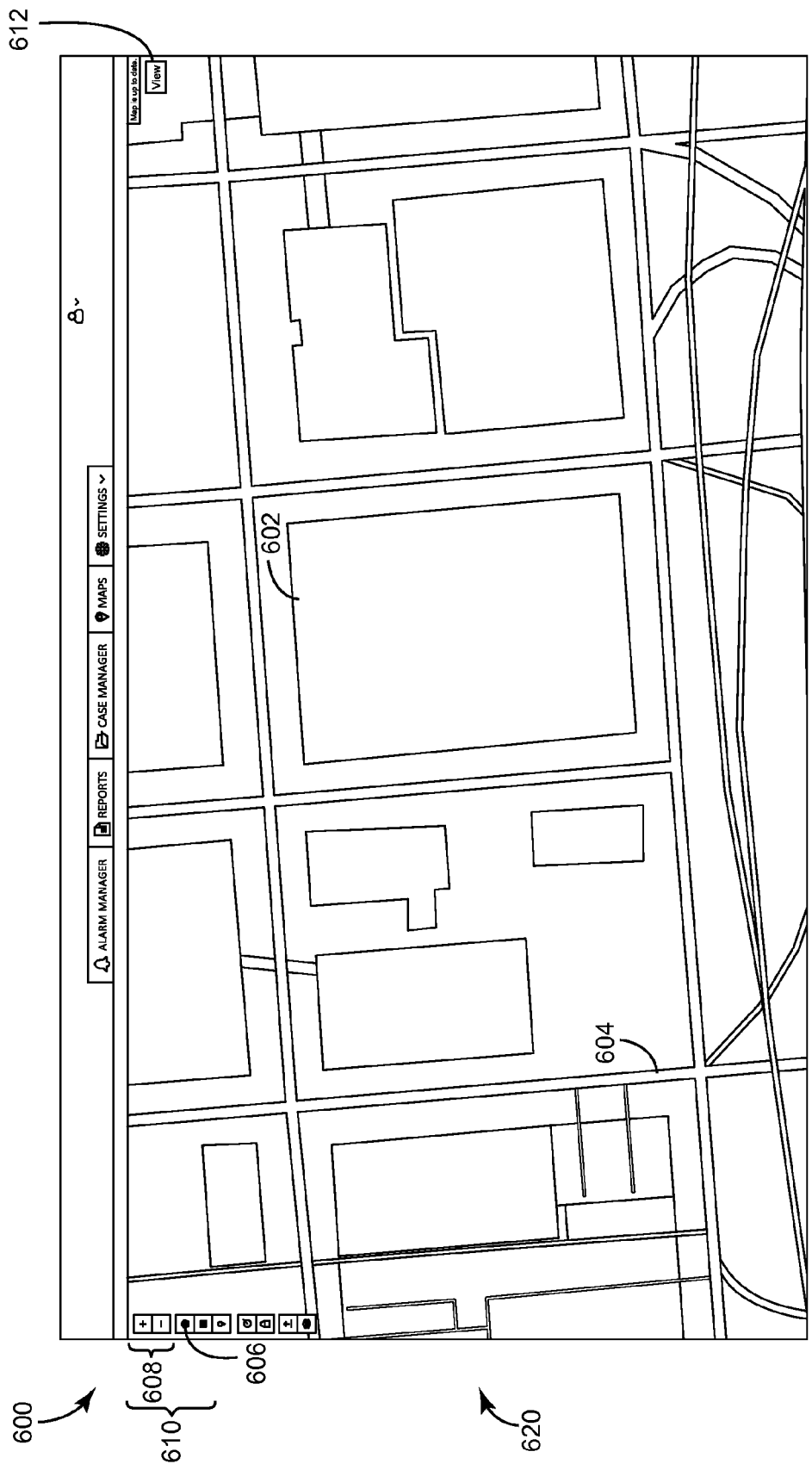

FIGS. 6A-6B illustrate a map interface 600. Map interface 600 displays a map 620 of a geographic area. Map 620 may be received from map provider 502 (e.g., an Internet-based map service such as Open Street Maps or Google Maps) and may include any level of detail and/or granularity. For example, FIG. 6A shows a zoomed-out view in which map 620 displays the entire world, whereas FIG. 6B shows a zoomed-in view in which map 620 displays a smaller geographic area. Map 620 may include roads 604, buildings 602, bodies of water, land, and/or other manmade or naturally-occurring items that have a fixed geolocation. Map 620 may include geolocation data (e.g., GPS coordinates, latitude and longitude coordinates, etc.) that define the geolocations of the items displayed in map 620. Each point on map 620 may be associated with a particular geolocation. The geolocations of the items displayed in map 620 may be defined by map 620 and/or by geolocation data associated with map 620.

Map 620 may be an interactive map that can be manipulated by a user to view any location. Zoom buttons 608 can be used to zoom in on a particular area or zoom out to view a broader area. Other interactive buttons 610 can be used to pan map 620, search for a particular area, and/or facilitate other user interactions with map 620. For example, button 612 may be used to toggle between a view mode and an edit mode. In the view mode, map 620 can be viewed along with any floorplans, building spaces, and/or building equipment that have been overlaid onto map 620. The view mode may also be used to view any alarms associated with the building equipment and/or building spaces. In the edit mode, map 620 can be overlaid with floorplans, building spaces, and building equipment to allow a user to define the geolocations of the floorplans, building spaces, and building equipment relative to map 620. For example, upload button 606 can be selected to display an upload overlay interface 700.

Referring now to FIGS. 7A-7B, an upload overlay interface 700 is shown, according to an exemplary embodiment. Upload overlay interface 700 may be used to establish the geolocation of a floorplan 702 or other overlay. Interface 700 is shown to include an upload overlay window 710 that includes a find building portion 712, a choose file portion 714, an overlay information portion 716, and a submit portion 724. Find building portion 712 may include a search box that allows a user to search for a particular location (e.g., by address, by building name, etc.) to center map 620 on a desired location.

Choose file portion 714 may allow a user to upload an image file, a CAD model, or any other graphic of a floorplan 702. Once floorplan 702 is uploaded, interface 700 may facilitate positioning floorplan 702 relative to map 620. In some embodiments, the corners of floorplan 702 are marked with pins 704 in interface 700. The positions of pins 704 can be adjusted (e.g., by dragging and dropping pins 704) to adjust the size, orientation, and/or position of floorplan 702 relative to map 620. For example, FIG. 7A shows floorplan 702 in a partially-aligned position in which only one of pins 704 is aligned with a corner of building 602. FIG. 7B shows floorplan 702 in a fully-aligned position in which all of pins 704 are aligned with the corners of building 602. Advantageously, positioning floorplan 702 relative to map 620 establishes the geolocation of a floor or building represented by floorplan 702 (i.e., the location of the floor or building relative to the Earth).

Overlay information portion 716 may allow a user to specify whether the uploaded file is a floorplan or a background. If the uploaded file is a floorplan, overlay information portion 716 can be used to enter information associated with the floorplan such as a building name 718, a floor number 720, and an elevator level 722. Building name 718 may be a user-defined attribute specifying the name of the building associated with the uploaded floorplan 702. In FIG. 7B, building name 718 is shown as "507." Floor number 720 may be the number of the floor represented by floorplan 702 (e.g., relative to the lowest floor in the building). Elevator level 722 may be the floor label as the floor would appear in an elevator. For example, if the uploaded floorplan 702 is for the lobby of a building, the floor number 720 may be specified as "0" and the elevator level 722 may be specified as "L."

Submit portion 724 is shown to include a submit button 726. Once floorplan 702 is positioned relative to map 620, a user can select submit button 726 to create a building space representing a floor of the building. Any information provided via overlay information portion 716 may be stored as attributes of a building space object representing the building space. The perimeter of floorplan 702 may be automatically detected and set as geometric boundaries of the created building space. Advantageously, the geolocation information provided by map 620 may be used to automatically determine the geolocation of the building space. For example, the locations of pins 704 may be stored as vertices of a geometric object (e.g., a parallelogram) representing the created building space. The geolocation of the building space may be defined by the locations of pins 704 relative to map 620. Floorplan geolocator 522 may automatically determine the geolocation of the building space represented by floorplan 702 and store the geolocation as an attribute of the building space.

Referring now to FIGS. 8A-8C, a space configuration interface 800 is shown, according to an exemplary embodiment. Space configuration interface 800 may be used to create building spaces, establish the geolocations of the building spaces, and associate the created building spaces with other building spaces. Building spaces can be created by drawing line segments in interface 800. For example, FIG. 8A shows a building space 802 as a closed geometric shape formed by line segments 822, 824, 826, 828, 830, 832, 834, and 836. Line segments of any length or type (e.g., linear, curved, freeform, etc.) can be drawn via user interface 800 and connected to define the locations, sizes, and/or shapes of building spaces. The geolocation of building space 802 may be automatically determined by space geolocator 524 using the geolocation data provided by map 620 onto which building space 802 is overlaid.

Space configuration interface 800 is shown to include a configure space window 810. Configure space window 810 may be used to enter or confirm details of the created building space 802. In some embodiments, configure space window 810 includes data fields that allow a user to specify a name 812 for the created building space 802 (e.g., "Auditorium") and a type or category 814 of the created building space 802 (e.g., "Room," "Office," "Stairwell," "Elevator Shaft," etc.). Configure space window 810 is shown to include a parent space selector 816 that allows a user to confirm or change the parent space for the created building space 802.

Advantageously, the parent space may be automatically determined (e.g., as described with reference to parent space detector 526) and presented as an attribute that the user can confirm or change via space configuration interface 800. For example, the parent space for building space 802 may be automatically detected as the building space 820 representing the floor on which building space 802 is located. The parent building space 820 may be identified by a text string that defines the location of building space 820 within a hierarchy of building spaces. For example, the parent space selector 816 shown in FIG. 8A identifies building space 820 using the hierarchical string "507/L" where the building space named "507" represents the entire building, the building space named "L" represents a floor of the building, and "/" is a delimiter between building spaces in the hierarchal string. A user can select submit button 818 to create a building space object representing building space 802. Any information provided via configure space window 810 may be stored as attributes of the building space object representing building space 802.

As shown in FIG. 8B, building spaces may be created within other building spaces. For example, building space 840 may be created by defining a closed geometric shape within building space 802. Configure space window 810 may be used to enter or confirm details of the created building space 840. Building space 840 is shown to include a name 812 of "Stage" and a category 814 of "Space." In FIG. 8B, parent space selector 816 is shown displaying the value "507/L/Auditorium," which identifies the building space representing the auditorium (i.e., building space 802) as the parent building space. Parent space detector 526 may automatically detect building space 802 as the parent building space using geometric heuristics, as described with reference to FIG. 5A.

As shown in FIG. 8C, some building spaces may be created as building-level spaces. Building-level spaces may include spaces that span multiple floors and do not have any single floor as a parent space (e.g., elevator shafts, stairwells, etc.). For example, building space 842 is shown as a space representing an elevator shaft within the building. In some embodiments, parent space detector 526 determines whether a building space is a floor-level space or a building-level space based on the category 814 of the building space provided via space configuration interface 800. For example, if the user selects a building-level space category (e.g., stairwell, elevator shaft, etc.) as the category 814 for building space 842, parent space detector 526 may classify building space 842 as a building-level space. If building space 842 is categorized as a building-level space, parent space selector 816 may list the building space representing the entire building as the parent for building space 842. For example, in FIG. 8C, parent space selector 816 is shown displaying the value "507," which identifies the building space "507" representing the entire building as the parent space for building space 842.

Referring now to FIGS. 9A-9C, an equipment configuration interface 900 is shown, according to an exemplary embodiment. Equipment configuration interface 900 may be generated by equipment creator 530 to establish the geolocations of building equipment and to associate the building equipment with building spaces. Interface 900 is shown to include an item location tool 908. Item location tool 908 may be used to define the locations of building equipment relative to floorplan 702. As shown in FIG. 9A, a user can drag and drop a pin 906 onto floorplan 702 to specify the location of an item of building equipment. In some instances, an item of building equipment may be located outside the building (e.g., an external security camera). As shown in FIG. 9C, a user can drag and drop a pin 907 anywhere on map 620 to specify the location of the building equipment. Building equipment located within the building may be located within the boundaries of floorplan 702, whereas building equipment located outside the building may be located outside the boundaries of floorplan 702. The geolocation of the building equipment may be automatically determined by equipment geolocator 532 using the geolocation data provided by map 620 onto which floorplan 702 is overlaid.

Referring again to FIG. 9A, equipment configuration interface 900 is shown to include an item type selection window 910. Item type selection window 910 may be used to define the type of building equipment represented by pins 906-907. In some embodiments, item type selection window 910 is displayed in response to a user selecting a pin 906-907 via interface 900. Item type selection window 910 is shown to include a listing of various types of items which may be located in the building. For example, item type selection window 910 is shown to include selectable icons or buttons representing cabinets, cameras, counters, doors, field controllers, fire detectors, fire points, fire zones, host events, input points, intrusion annunciators, intrusion areas, intrusion zones, alarms, output points, and supervisory controllers. Although only a few different types of building equipment are shown in FIG. 9A, it is contemplated that item type selection window 910 may include any type of equipment (e.g., HVAC equipment, electrical equipment, communications equipment, security equipment, lighting equipment, etc.) or other types of objects located within a building (e.g., furniture, fixtures, etc.).

Referring now to FIG. 9C, equipment configuration interface 900 is shown to include an equipment configuration window 912. Equipment configuration window 912 may include a data field that allows a user to specify a name 914 for an item of building equipment (e.g., "Camera1"). Equipment configuration window 912 may also include a parent space selector 916 that allows a user to confirm or change the parent space for the item of building equipment. In FIG. 9C, parent space selector 916 is shown displaying the value "507/L/Office 101," which identifies a building space 902 representing a particular office as the parent building space.

Parent space detector 536 may automatically detect building space 902 as the parent building space using geometric heuristics, as described with reference to FIG. 5A. For example, parent space detector 536 may identify the smallest building space that contains the item of building equipment as the parent space. Since building space 902 is the smallest space that contains pin 906, parent space detector 536 identifies building space 902 as the parent building space. If pin 906 were instead placed within building space 904, parent space detector 536 would detect building space 904 as the parent building space.

A user can select submit button 918 to create an equipment object representing the item of building equipment. Any information provided via item type selection window 910 and/or equipment configuration window 912 may be stored as attributes of the equipment object. In some embodiments, creating an equipment object causes interface 900 to replace the pin associated with the equipment object with a selectable icon or graphic representing the building equipment. For example, FIG. 9C is shown to include a camera icon 920 in place of pin 906. Camera icon 920 may automatically replace pin 906 once the building equipment associated with pin 906 is defined as a camera. Other types of building equipment may have different icons that visually depict the type of building equipment for easy identification via interface 900.

Referring now to FIG. 10, a door configuration interface 1000 is shown, according to an exemplary embodiment. Door configuration interface 1000 may be generated by door creator 540 to establish the geolocations of doors and to associate the doors with building spaces. In some embodiments, door configuration interface 1000 is the same or similar to equipment configuration interface 900. For example, interface 1000 is shown to include item location tool 908. Item location tool 908 may be used to define the locations of doors relative to floorplan 702. A user can drag and drop a pin 1002 onto floorplan 702 to specify the location of a door. The geolocation of the door may be automatically determined by door geolocator 542 using the geolocation data provided by map 620 onto which floorplan 702 is overlaid.

Door configuration interface 1000 is shown to include a door configuration window 1012. In some embodiments, door configuration window 1012 is displayed in response to a user selecting an item type of "door" via item type selection window 910. Door configuration window 1012 may include a data field that allows a user to specify a name 1014 for a door (e.g., "Door2"). Door configuration window 1012 may also include connected space selectors 1016 and 1018 that allows a user to confirm or change the building spaces connected by the door. In FIG. 10, connected space selector 1016 is shown displaying the value "507/L/Office101," which identifies building space 902 as one of the building spaces connected by the door. Connected space selector 1018 is shown displaying the value "507/L/Auditorium," which identifies building space 802 as the other building space connected by the door. Connected spaces detector 546 may automatically detect building spaces 902 and 802 as the building spaces connected by the door using geometric heuristics, as described with reference to FIG. 5A.

A user can select submit button 1020 to create a door object representing the door. Any information provided via item type selection window 910 and/or door configuration window 1012 may be stored as attributes of the door object. In some embodiments, creating a door object causes interface 1000 to replace the pin associated with the door object with a selectable icon or graphic representing the building equipment. For example, FIG. 9C is shown to include a door icon 1004 in place of pin 1002. Door icon 1004 may automatically replace pin 1002 once the item associated with pin 1002 is defined as a door.

Figure 11A:
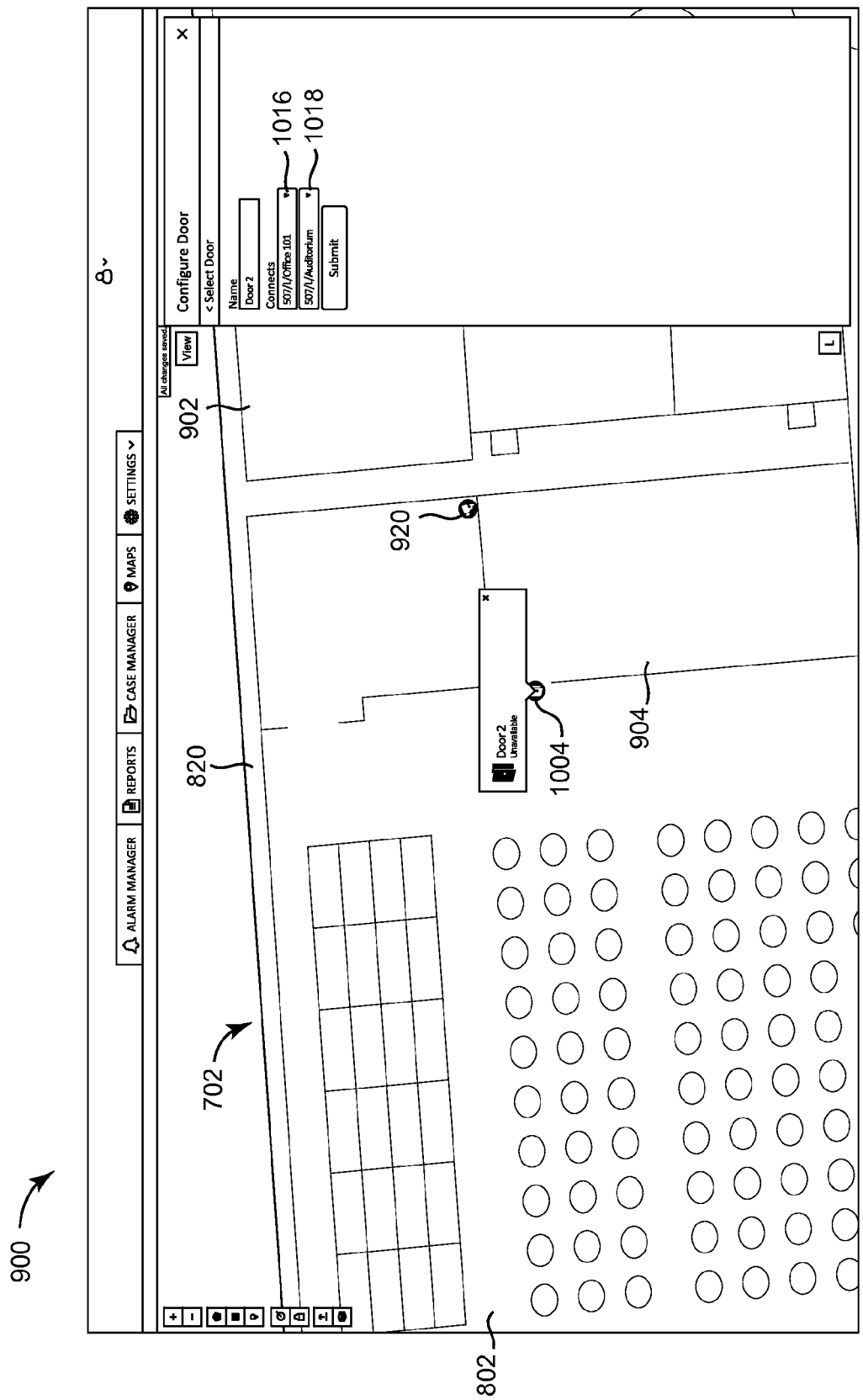
FIGS. 11A-11B are drawings of an interface which may be used by the space creator and/or the equipment creator of FIGS. 5A-5B to delete building spaces and/or change the geolocations of items within the building spaces, according to an exemplary embodiment.
Figure 11B:
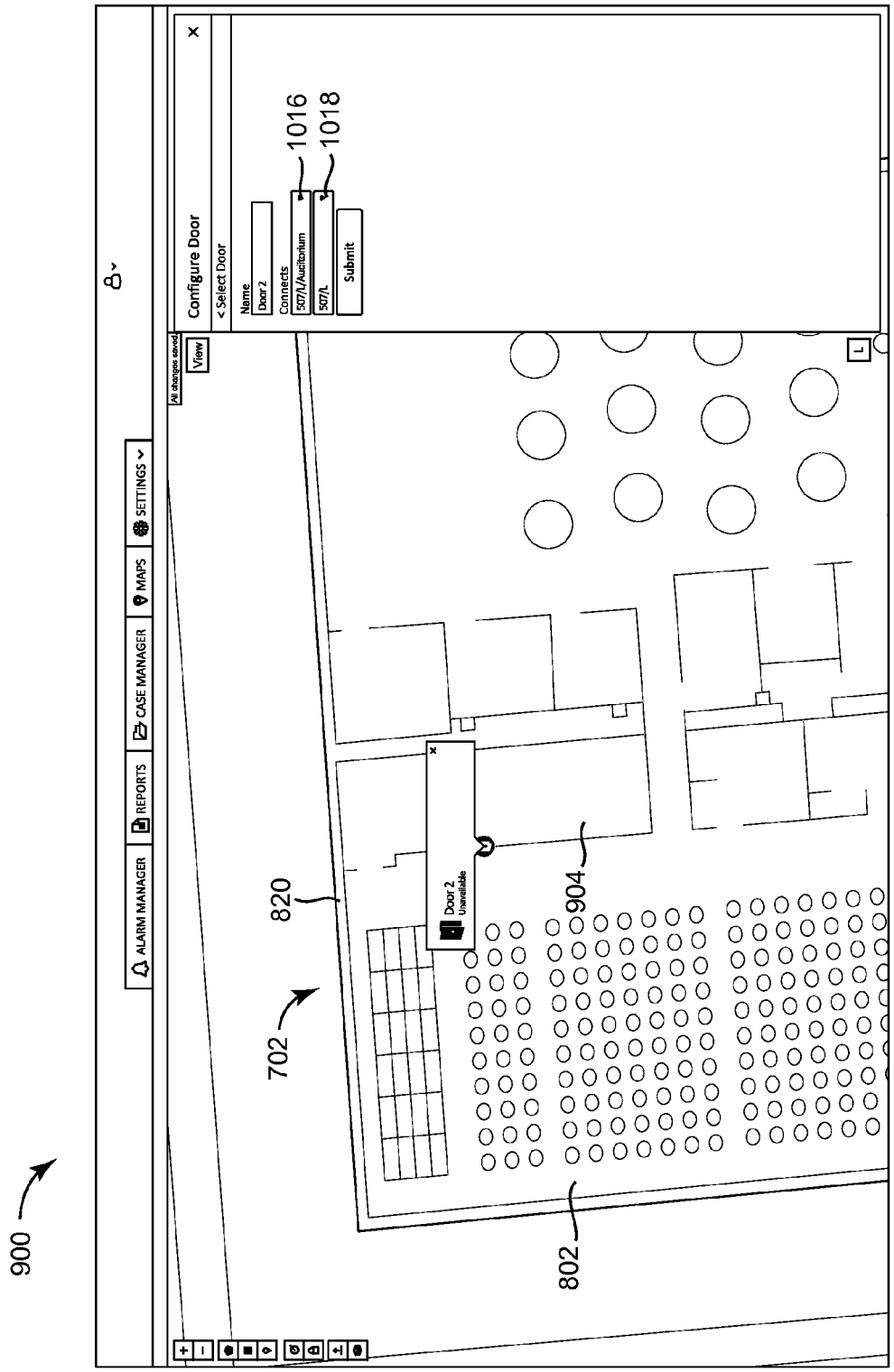

Referring now to FIGS. 11A-11B, equipment configuration interface 900 and door configuration interface 1000 may be configured to automatically update the attributes of items (e.g., building equipment, doors, etc.) when building spaces are added or deleted, or if the items are moved to a different location. For example, a user can drag and drop door icon 1004 to a different location relative to floorplan 702 to change the location of the door. When door icon 1004 is moved, door geolocator 542 may automatically determine the new geolocation of the door using the geolocation data provided by map 620 onto which floorplan 702 is overlaid. Connected spaces detector 546 may then determine a new set of building spaces connected by the door using geometric heuristics. For example, when door icon 1004 is moved from the location shown in FIG. 9C to the location shown in FIG. 11A, connected spaces detector 546 may update the connected spaces attribute(s) for the corresponding door object to indicate that the door now connects building space 904 to building space 802. Connected space selectors 1016 and 1018 may also be updated to reflect the connected building spaces.

Similarly, a user can drag and drop an icon representing an item of building equipment (e.g., camera icon 920) to a different location relative to floorplan 702 to change the location of the item of building equipment. For example, when camera icon 920 is moved, equipment geolocator 532 may automatically determine the new geolocation of the camera using the geolocation data provided by map 620.

Parent space detector 536 may then determine a new parent space for the item of building equipment using geometric heuristics. For example, if camera icon 920 is moved out of building space 902 and into building space 904, parent space detector 536 may update the parent space attribute for the corresponding item of building equipment to indicate that the building equipment is located within building space 904. Parent space selector 916 may also be updated to reflect the new parent building space.

If an existing building space is deleted, any attribute referencing the deleted building space may be updated (e.g., by equipment creator 530 and/or door creator 540) to reference the parent building space of the deleted building space. For example, FIG. 11A shows Door_2 connecting building spaces 904 and 802. Connected space selector 1016 is shown displaying a connected space attribute of "507/L/Office_102" identifying building space 904, whereas connected space selector 1018 is shown displaying a connected space attribute of "507/L/Auditorium" identifying building space 802. As shown in FIG. 11B, if building space 904 is deleted, the connected space attribute referencing building space 904 (i.e., "507/L/Office_102") may be replaced with a connected space attribute referencing building space 820 (i.e., "507/L"), the parent of the deleted building space 904. The parent building space of any items located within the deleted building space may be updated in a similar manner. If a new building space is added, equipment creator 530 may automatically update the parent space attributes of any items located within the added building space and door creator 540 may automatically update the connected space attributes of any doors connecting the added building space.

In some embodiments, interfaces 600-1000 can be used to create building spaces representing multiple different buildings, which may be located in different geographic areas. For example, a user can upload floorplans for several different buildings and establish the locations of the floorplans relative to map 620 to define building spaces for each of the buildings. Any number of building spaces can be created within each building and associations between the building spaces can be automatically established by space creator 520. Building equipment and other items can be dragged and dropped onto map 620 to establish relationships between the building spaces and the items contained therein. After the building spaces and item associations have been created, the interface can be toggled into view mode (e.g., by selecting button 612) to view and manage alarms associated with the building equipment and/or building spaces.

Figure 12:
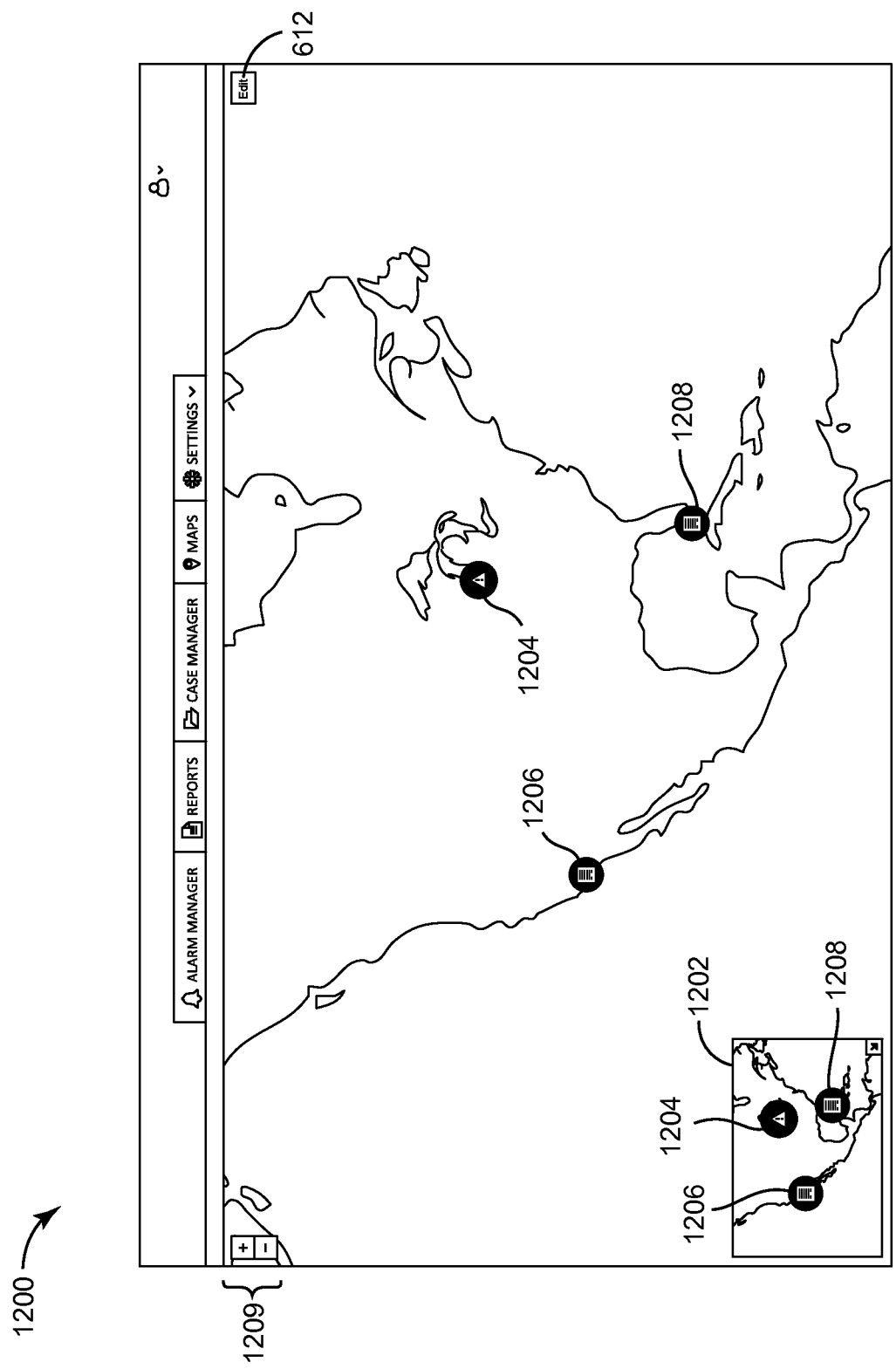
FIG. 12 is a drawing of an alarm manager interface which may be generated by the alarm manager of FIGS. 5A-5B to view and respond to alarms associated with building equipment and/or building spaces, according to an exemplary embodiment.

Referring now to FIGS. 12-14C, an alarm manager interface 1200 is shown, according to an exemplary embodiment. Alarm manager interface 1200 may be generated by alarm manager 508 to view and respond to alarms associated with building equipment and/or building spaces. FIG. 12 shows a zoomed-out view of interface 1200 in which map 620 displays the entire geographic area within which all of the created building spaces and items are located. In some embodiments, interface 1200 automatically adjusts the zoomed-out view based on the locations of the created building spaces. For example, if building spaces are created in multiple different states across the United States, the zoomed-out view may show the entire continental United States. However, if building spaces are created within a single state or city, the zoomed-out view may show only the state or city. In some embodiments, the zoomed-out view shows the smallest geographic area that contains all of the created building spaces.

Interface 1200 may be an interactive interface that can be manipulated by a user to view any location. Zoom buttons 1209 can be used to zoom in on a particular area or zoom out to view a broader area. The locations of the building spaces may be marked by icons on map 620. For example, interface 1200 is shown to include an icon 1204 representing a building in Wisconsin, an icon 1206 representing a building in California, and an icon 1208 representing a building in Florida. In some embodiments, interface 1200 displays a building icon for each building or facility for which a building space has been created. If any alarms associated with a building (or a building space contained within the building) are detected, interface 1200 may change the icon representing the building to indicate the presence of an alarm (e.g., by changing the color or symbol displayed in the icon). Selecting an icon representing a building may cause interface 1200 to zoom in on geographic area in which the building is located. In some embodiments, interface 1200 includes a minimap 1202 that displays the zoomed-out view at all times.

Figure 13A:
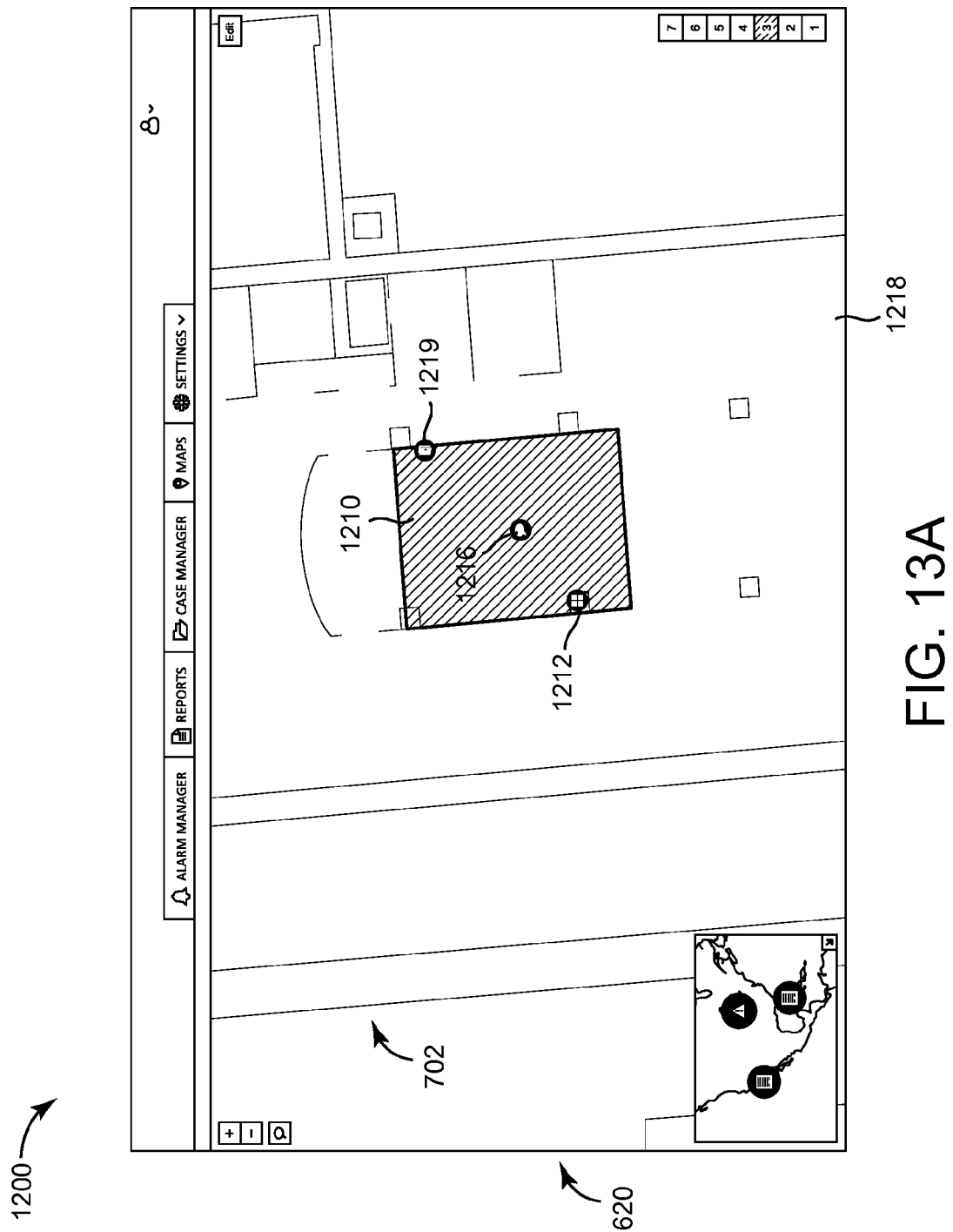
FIGS. 13A-13D are drawings of the alarm manager interface of FIG. 12 illustrating the visualization of an alarm associated with a building space and the interface options provided by the alarm manager interface for responding to the alarm, according to an exemplary embodiment.

Referring now to FIGS. 13A-13D, a zoomed-in view of alarm manager interface 1200 is shown, according to an exemplary embodiment. In FIG. 13A, alarm manager interface 1200 is shown displaying a portion of a floorplan 702 which has been overlaid onto map 620. A building space 1210 is located within floorplan 702. Building space 1210 is shown to include a cabinet icon 1212 representing a physical cabinet within building space 1210 and a door icon 1214 representing a door along a boundary of building space 1210. The door connects building space 1210 to a building space 1218 representing the entire floor on which building space 1210 is located.

When an alarm associated with building space 1210 is detected, alarm manager interface 1200 may change the appearance of building space 1210 to indicate the presence of the alarm. For example, alarm manager interface 1200 may cause building space 1210 to be displayed in a first color (e.g., blue) when no alarms associated with building space 1210 are detected and a different color (e.g., red) when an alarm associated with building space 1210 is detected. In some embodiments, alarm manager interface 1200 alters the appearance of any icons 1212-1214 located within building space 1210 when an alarm associated with building space 1210 is detected (e.g., by changing the color of icons 1212-1214). Alarms may be associated with a building space and/or with individual items located within the building space. In some embodiments, alarm manager interface 1200 propagates alarms upward from items to the parent building space for the items. For example, if an alarm is detected for the cabinet represented by icon 1212, alarm manager interface 1200 may propagate the alarm upward to building space 1210.

Figure 13B:
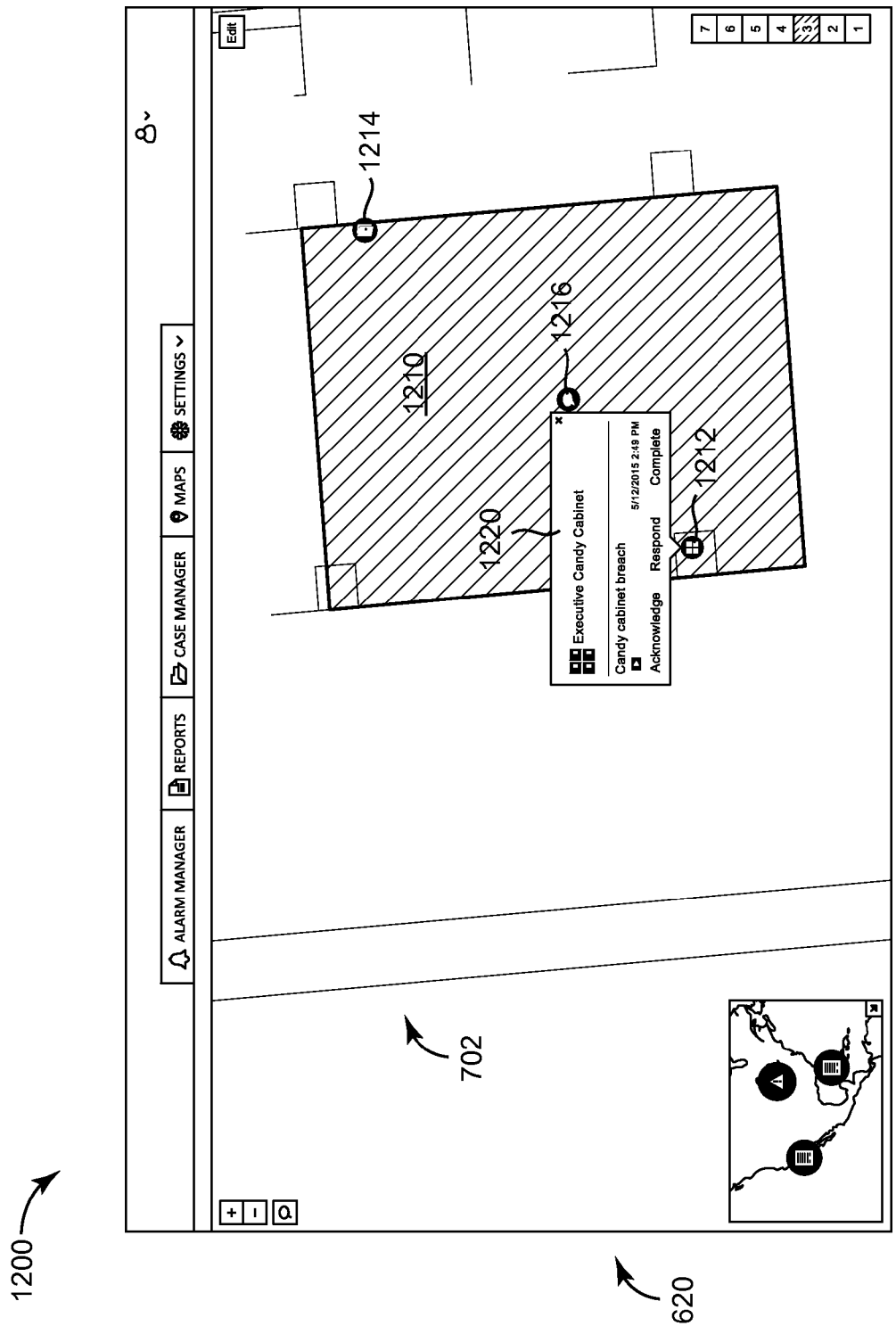

As shown in FIG. 13B, selecting an icon 1212 representing an item of building equipment may cause interface 1200 to display an equipment status window 1220. Equipment status window 1220 may be used to monitor and control the corresponding item of building equipment. For example, equipment status window 1220 is shown displaying the name of the cabinet associated with icon 1212 as "Executive Candy Cabinet" and includes details regarding the alarm for the cabinet (i.e., "candy cabinet breach"). In some embodiments, equipment status window 1220 includes the results of any diagnostic tests associated with the alarm (e.g., stuck temperature sensor, chiller failure, etc.). Equipment status window 1220 may include interface options for acknowledging and/or responding to the alarm.

In some embodiments, equipment status window 1220 includes interface options for controlling the corresponding item of building equipment. For example, equipment status window 1220 may be configured to receive user input specifying a command for the building equipment (e.g., turning the equipment on/off, changing an operating mode for the building equipment, adjusting a setpoint, changing a configuration parameter, etc.). Commands received via alarm manager interface 1200 may be sent to space controller 506 and communicated to the building equipment via BMS interface 409, as described with reference to FIG. 5A.

Figure 13C:
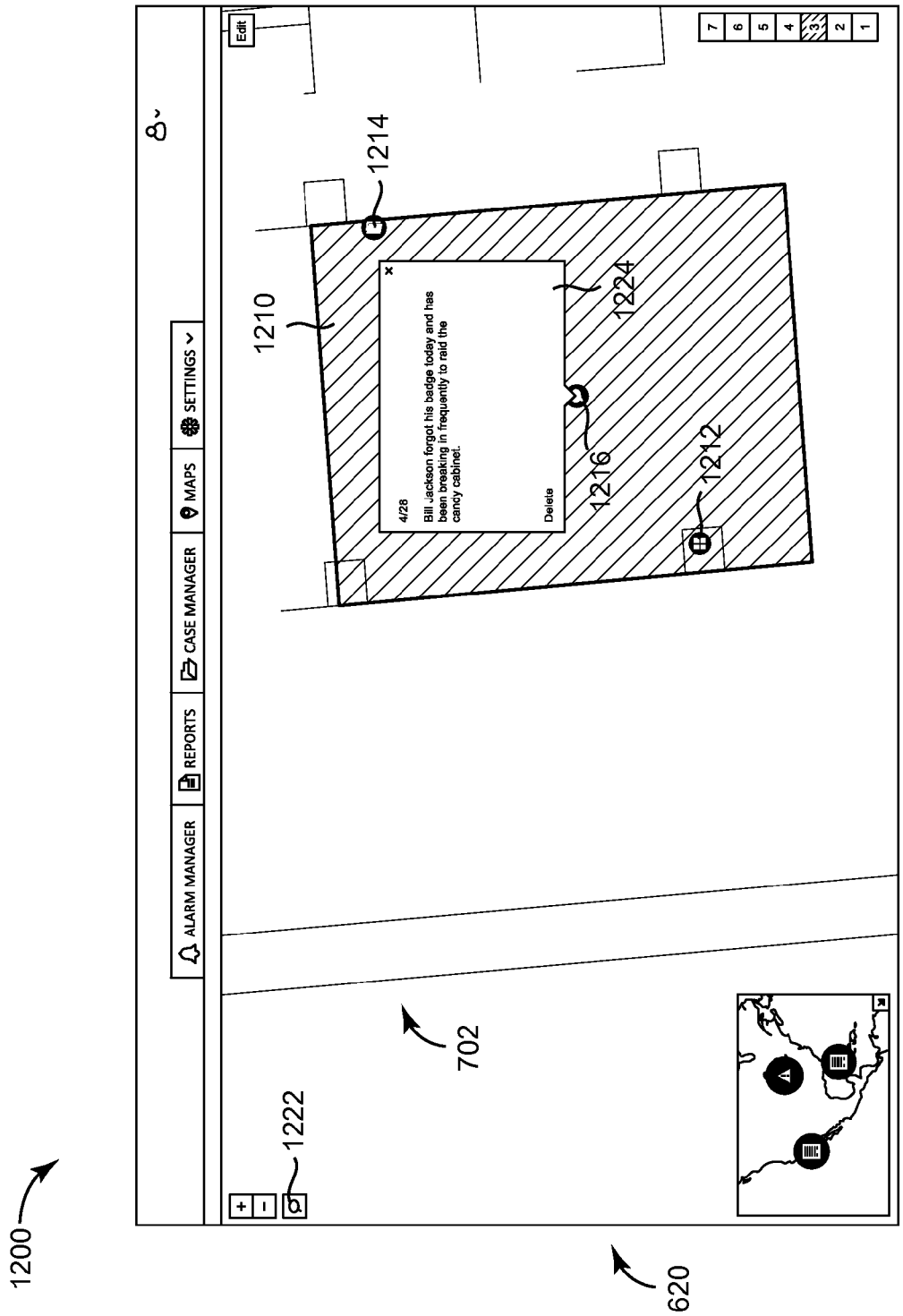

As shown in FIG. 13C, alarm manager interface 1200 may allow a user to create and view notes. Notes can be created by selecting note creation tool 1222 and placing a note icon 1216 onto map 620. Selecting note icon 1216 may cause alarm manager interface 1200 to display a note window 1224. A user can enter text into note window 1224 and save the text as an attribute of the note. Note icon 1216 may be visible to other users viewing alarm manager interface 1200 and can be selected to display note window 1224. Since different users may view interface 1200 using different client devices, notes may provide the users with a mechanism to communicate with each other regarding specific building spaces and/or the alarms associated therewith. For example, a first user (e.g., an office worker) may create a note explaining the reason for an alarm and place a note icon 1216 onto map 620. A second user (e.g., security personnel) may view the note and can clear the alarm if the reason for the alarm is of no concern.

Figure 13D:
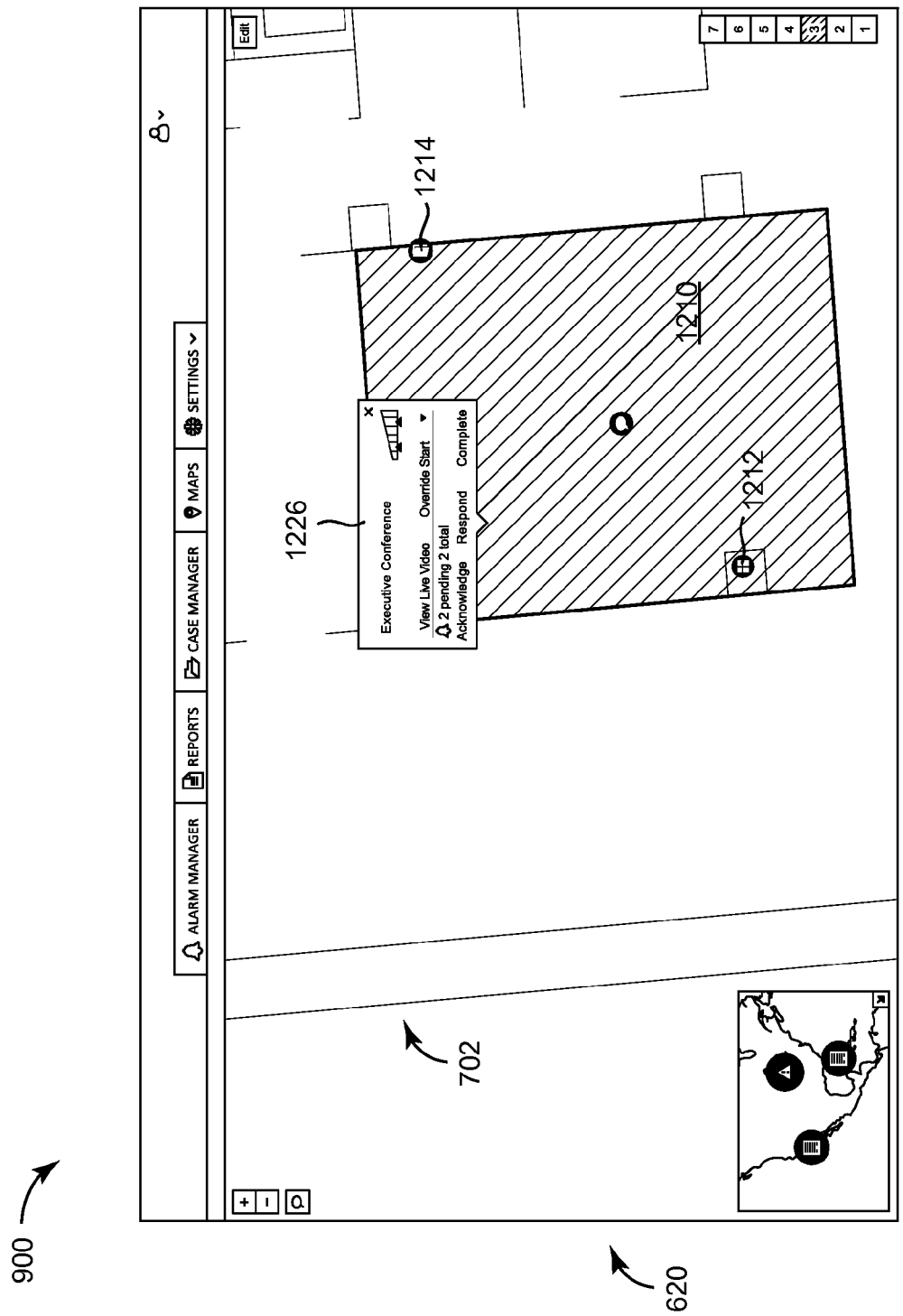

As shown in FIG. 13D, selecting a building space via alarm manager interface 1200 may cause alarm manager interface 1200 to display a space status window 1226. Space status window 1226 may be used to monitor and control building spaces. For example, space status window 1226 is shown displaying the name of building space 1210 as "Executive Conference" and may include details regarding any alarms associated with building space 1210. Details regarding alarms may include, for example, a total number of alarms associated with the building space, a status of the alarms (e.g., whether the alarms have been acknowledged or investigated), an indication of a particular item of building equipment from which the alarm has been propagated, diagnostic results associated with the alarm, and/or any other information which may be useful in describing or communicating alarms to a user.

Space status window 1226 may include interface options for acknowledging and/or responding to the alarm. Acknowledging an alarm may include clearing the alarm without taking corrective action. Responding to an alarm may include performing a control action in response to the alarm. For example, if the alarm is a security breach within building space 1210, responding to the alarm may include locking all of the doors that connect to building space 1210 to prevent further intrusion. In some embodiments, alarm manager 508 receives user input via alarm manager interface 1200 indicating a desired control action for responding to an alarm. For example, space status window 1226 may be configured to receive user input specifying a desired control action for building space 1210. Commands received via alarm manager interface 1200 may be sent to space controller 506 and communicated to the building equipment via BMS interface 409, as described with reference to FIG. 5A.

Control actions may be specified as commands for building space 1210 and/or as commands for individual items of building equipment within building space 1210. In some embodiments, space status window 1226 includes interface options that allow a user to set a security level for building space 1210. The security level may correspond to a predetermined set of control actions or control states for the items within building space 1210. For example, setting the security level to a highest level of security may automatically cause space controller 506 to close and lock all of the doors connecting to building space 1210. Advantageously, the set of control actions associated with various security levels can be adjusted by a user to allow a customized set of control actions to be carried out simultaneously upon setting the security state.

Figure 14A:
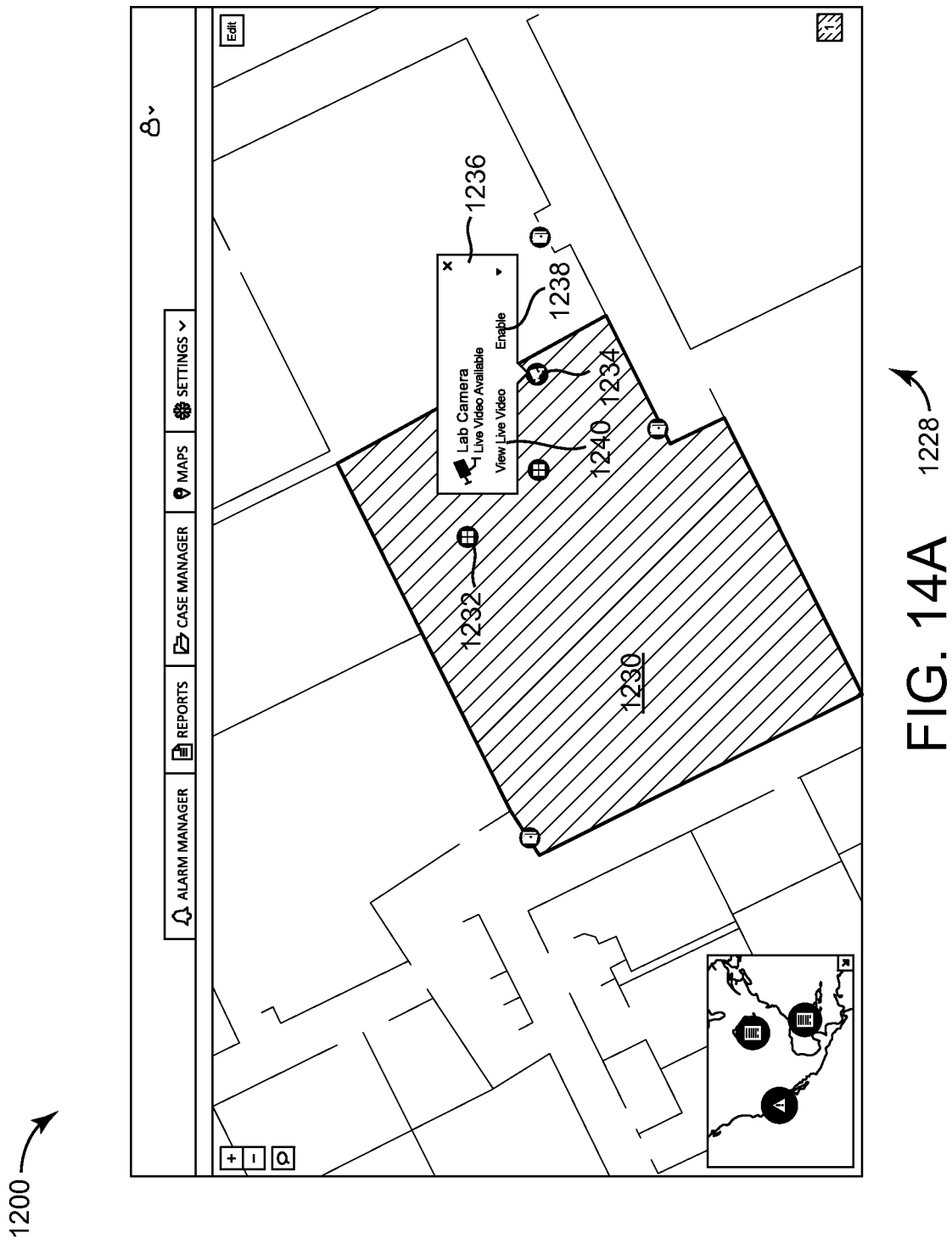
FIGS. 14A-14C are drawings of the alarm manager interface of FIG. 12 illustrating the visualization of an alarm associated with another building space and the ability of the alarm manager interface to display live video from the building space and to initiate control actions for equipment within the building space, according to an exemplary embodiment.
Figure 14B:
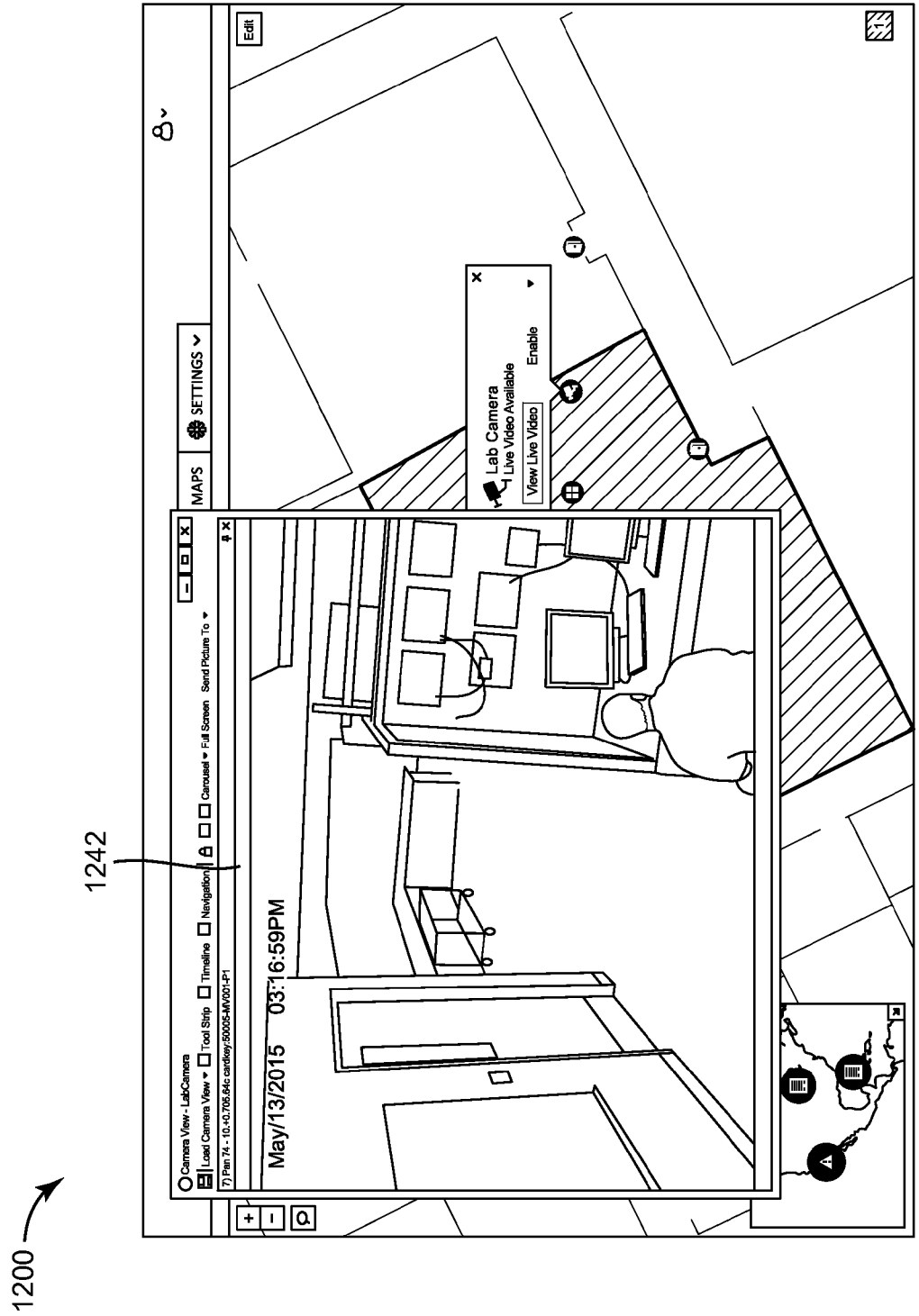
Figure 14C:
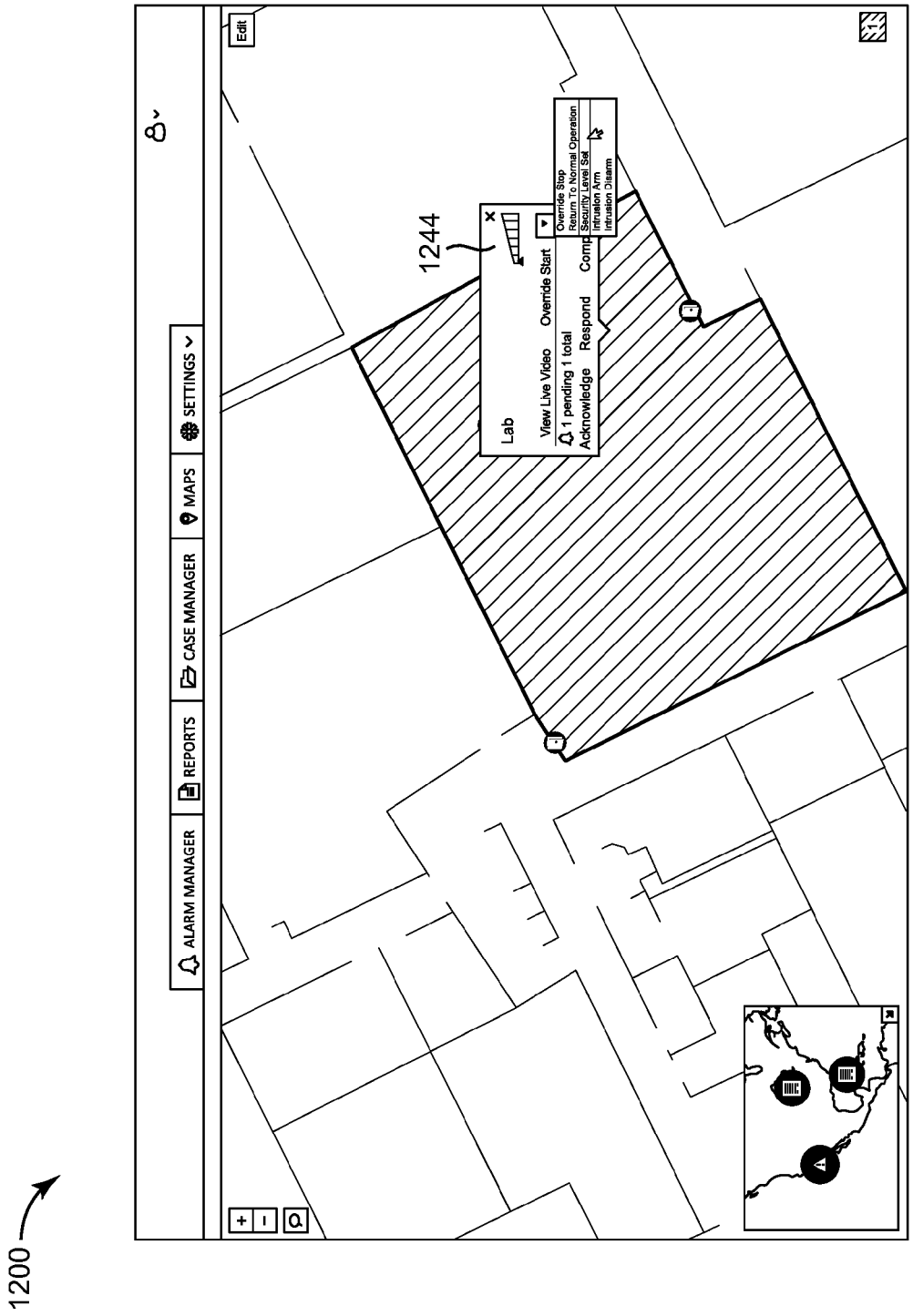

Referring now to FIGS. 14A-14C, alarm manager interface 1200 is shown displaying a portion of another floorplan 1228 which has been overlaid onto map 620. A building space 1230 is located within floorplan 1228. Building space 1230 is shown to include a cabinet icon 1232 representing a physical cabinet within building space 1230 and a camera icon 1234 representing a camera located within building space 1230. Cabinet icon 1232 is shown in a highlighted state (e.g., flashing, red, animated, etc.) to indicate the presence of an alarm associated with the corresponding physical cabinet.

As shown in FIG. 14A, selecting camera icon 1234 may cause alarm manager interface 1200 to display an equipment status window 1236 for the camera. Equipment status window 1236 identifies the camera by name (i.e., "Lab Camera") and indicates that live video from the camera is available. Equipment status window may include interface options for monitoring and/or controlling the camera. For example, equipment status window 1236 is shown to include an enable/disable selector 1238 (e.g., for turning the camera on/off) and a live video link 1240.

As shown in FIG. 14B, selecting live video link 1240 may cause alarm manager interface 1200 to display a live video window 1242. Live video window 1242 may receive and present a live video feed from the camera via interface 1200. The live video feed allows a user to monitor conditions within building space 1230 and can be used to investigate an alarm associated with building space 1230. For example, if the alarm indicates that a security breach is detected within building space 1230, the live video feed may allow a user to determine whether an intruder is in building space 1230.

As shown in FIG. 14C, selecting building space 1230 via alarm manager interface 1200 may cause alarm manager interface 1200 to display a space status window 1244. Space status window 1244 may be the same or similar to space status window 1226 and may be configured to receive user input specifying a desired control action for building space 1230. For example, space status window 1244 is shown to include interface options that allow a user to set a security level for building space 1230, arm or disarm an intrusion alarm for building space 1230, override normal operating parameters for building space 1230, and return building space 1230 to normal operation. As previously described, setting a high security level may cause space controller 506 to automatically lock all of the doors that connect to building space 1230, thereby preventing the intruder from escaping.

Process for Configuring Building Spaces

Figure 15:
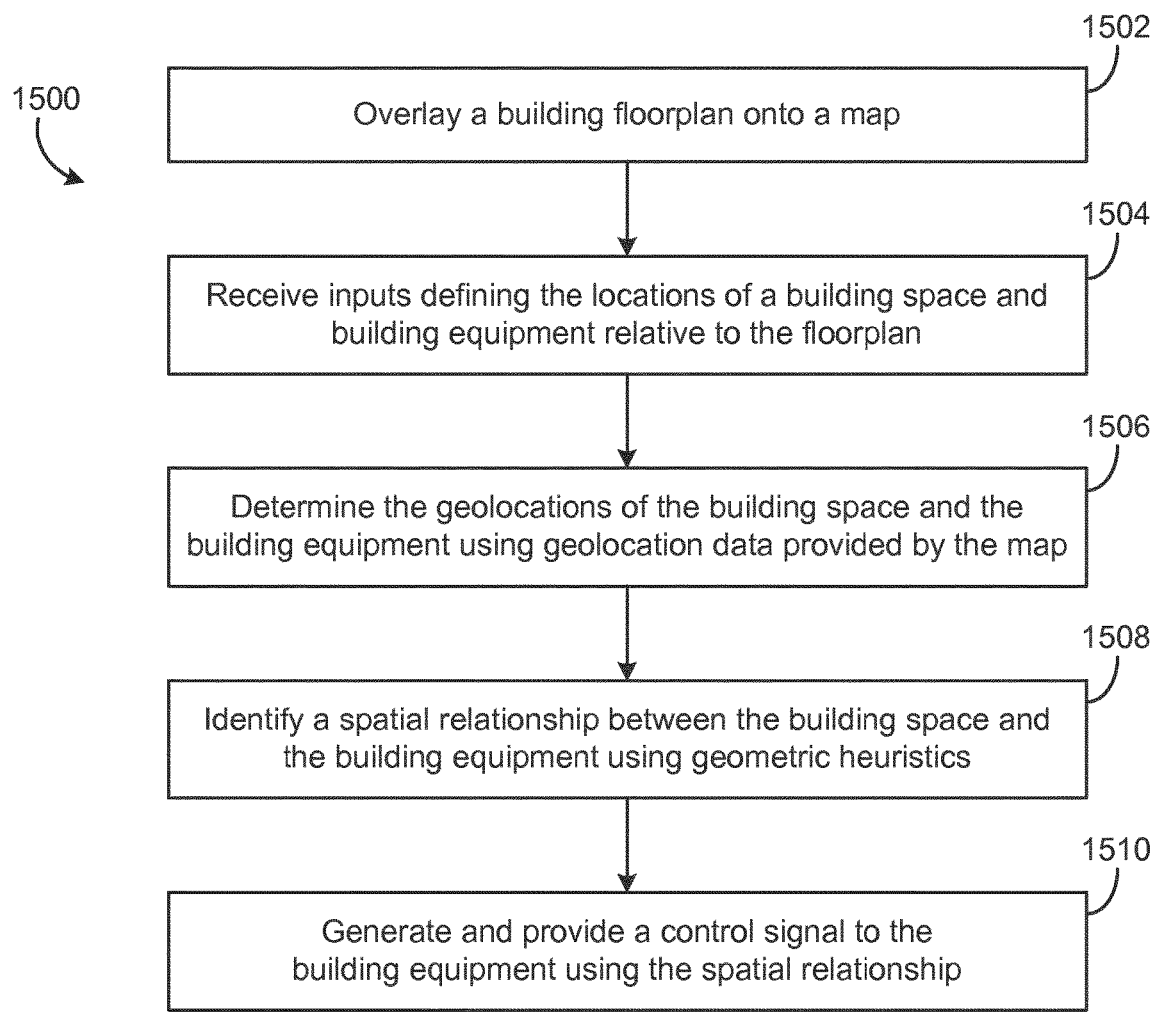
FIG. 15 is a flowchart of a process for configuring building spaces using geometric heuristics, according to an exemplary embodiment.

Referring now to FIG. 15, a flowchart of a process 1500 for configuring building spaces using geometric heuristics is shown, according to an exemplary embodiment. In some embodiments, process 1500 is performed by one or more components of BMS controller 366, as described with reference to FIG. 5A.

Process 1500 is shown to include overlaying a building floorplan onto a map (step 1502). The building floorplan may be received from a floorplan provider (e.g., a floorplan service or database) configured to provide BMS controller 366 with floorplans. In some embodiments, the floorplan provider is a user that provides BMS controller 366 with a floorplan by uploading the floorplan from the user's device.

In other embodiments, BMS controller 366 obtains floorplans from a third-party data source. Floorplans may be provided in a visual or graphical format (e.g., as pictures, drawings, architectural models, CAD models, etc.) and/or as data files.

The map may be received from a map provider (e.g., a map service or database) configured to provide BMS controller 366 with maps (e.g., geographic maps, street maps, city maps, etc.). In some embodiments, the map provider is an Internet-based map service such as Open Street Maps or Google Maps. The map may include geolocation data (e.g., GPS coordinates, latitude and longitude coordinates, etc.) that define the geolocations of roads, buildings, bodies of water, land, and/or other manmade or naturally-occurring items that have a fixed geolocation. Each point on the map may be associated with a particular geolocation. The geolocations of the items displayed on the map may be defined by the map and/or by the geolocation data associated with the map.

In some embodiments, step 1502 includes providing a graphical user interface that displays the floorplan overlaid onto the map. The graphical user interface may facilitate positioning the floorplan relative to the map. For example, the corners of the floorplan may be marked with pins. The positions of the pins can be adjusted (e.g., by dragging and dropping) to adjust the size, orientation, and/or position of the floorplan relative to the map. Advantageously, positioning the floorplan relative to the map establishes the geolocation of a floor or building represented by floorplan (i.e., the location of the floor or building relative to the Earth). In some embodiments, step 1502 includes determining the geolocation of the floorplan using the geolocation data provided by the map.

In some embodiments, step 1502 includes creating a building space representing the building and a building space representing the particular floor depicted by the floorplan. The building space representing the floor may be created as a subspace within the building space representing the entire building. In some embodiments, step 1502 includes naming the building and identifying the floor represented by the floorplan. The floor may be identified by a floor number (e.g., a number relative to the lowest floor in the building) and/or an elevator level (e.g., the floor label as the floor would appear in an elevator). For example, the basement of a building may be identified as floor number "0" and elevator level "B."

Still referring to FIG. 15, process 1500 is shown to include receiving inputs defining the locations of a building space and building equipment relative to the floorplan (step 1504). In some embodiments, the inputs are user inputs received via a graphical user interface. For example, the input defining the location of the building space may include a user drawing a border of the building space onto the floorplan via the graphical user interface. Building spaces can be created by drawing line segments of any length or type (e.g., linear, curved, freeform, etc.) and connecting the line segments to form closed geometric shapes. In some embodiments, step 1504 includes receiving details of the building spaces. For example, the graphical user interface may include data fields that allow a user to specify a name for the building space (e.g., "Auditorium") and a type of the building space (e.g., "Room," "Office," "Stairwell," "Elevator Shaft," etc.).

The input defining the location of the building equipment relative to the floorplan may include a user placing an icon representing the building equipment onto the floorplan via the graphical user interface. For example, a user can drag and drop icons or pins onto the floorplan to specify the location of an item of building equipment. In some instances, an item of building equipment may be located outside the building (e.g., an external security camera). A user can drag and drop an icon or pin anywhere on the map to specify the location of the building equipment. Building equipment located within the building may be located within the boundaries of the floorplan, whereas building equipment located outside the building may be located outside the boundaries of the floorplan.

In some embodiments, step 1504 includes defining the type of building equipment represented by the icons or pins. The graphical user interface may include a listing of various types of items which may be located in the building. For example, the graphical user interface may include selectable icons or buttons representing cabinets, cameras, counters, doors, field controllers, fire detectors, fire points, fire zones, host events, input points, intrusion annunciators, intrusion areas, intrusion zones, alarms, output points, supervisory controllers, or any other type of equipment or item which may be located within a building. The graphical user interface may also include a data field that allows a user to specify a name for an item of building equipment (e.g., "Camera1").

Still referring to FIG. 15, process 1500 is shown to include determining the geolocations of the building space and the building equipment using geolocation data provided by the map (step 1506). In some embodiments, the geolocation of the building space is determined using the geolocation of the floorplan and the location of the building space relative to the floorplan. Similarly, the geolocation of the building equipment may be determined using the geolocation of the floorplan and the location of the building equipment relative to the floorplan. In other embodiments, the geolocation of the floorplan is not required. For example, the geolocations of the building space and the building equipment may be determined using the positions of the building space and the building equipment relative to the map.

Process 1500 is shown to include identifying a spatial relationship between the building space and the building equipment using geometric heuristics (step 1508). In some embodiments, step 1508 includes determining whether the building equipment is located within the boundaries of the building space. The geolocations of the building equipment and the building space may be used to determine whether the building equipment is located within the building space.

In some embodiments, step 1508 includes determining whether the building space is the parent space for the building equipment. For example, step 1508 may include identifying a smallest existing building space that contains the building equipment and setting the identified building space as the parent space for the building equipment. If the building space is the smallest existing space that contains the building equipment, the building equipment may be identified as the parent space. In some embodiments, step 1508 includes establishing a control relationship between the building space and the building equipment in response to identifying the building space as the parent space. The control relationship may allow BMS controller 366 to identify the building equipment as associated with the building space.

In some embodiments, step 1508 includes identifying a parent space for the building space. For example, step 1508 may include determining an area of the building space, determining a location of a centroid of the building space, identifying a smallest existing building space that contains the centroid and has an area larger than the area of the building space, and setting the identified building space as the parent space for the building space.

Still referring to FIG. 15, process 1500 is shown to include generating and providing a control signal to the building equipment using the spatial relationship (step 1510). The spatial relationship may be used to establish a control relationship between the building space and the building equipment. Once the relationship between the building space and the building equipment is identified, desired control actions for the building space can be carried out by operating the building equipment. For example, the controller may receive an input specifying a desired control action for the building space without identifying the building equipment. The spatial relationship between the building space and the building equipment may allow the controller to identify the building equipment as associated with the building space. The controller may then generate a control signal for the building equipment to carry out the desired control action.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
   building equipment located within a building space;
   at least one of a building management system (BMS) controller or a client device comprising one or more processing circuits having one or more processors and memory, the one or more processing circuits comprising:
   a space controller configured to receive input from the building equipment and provide a control signal to the building equipment;
   a floorplan geolocator configured to receive a map providing geolocation data and overlay a building floorplan onto the map;
   a space geolocator configured to receive a first input defining a location of the building space relative to the floorplan and determine a geolocation of the building space using the geolocation data;
   an equipment geolocator configured to receive a second input defining a location of the building equipment relative to the floorplan and determine a geolocation of the building equipment using the geolocation data; and
   a parent space detector configured to use geometric heuristics and the geolocations of the building space and the building equipment to identify a spatial relationship between the building space and the building equipment;
   wherein the space controller is configured to use the spatial relationship between the building space and the building equipment to generate the control signal provided to the building equipment.

2. The building management system of claim 1, wherein:
   the floorplan geolocator is configured to use the geolocation data provided by the map to determine a geolocation of the floorplan;
   the space geolocator is configured to use the geolocation of the floorplan and the location of the building space relative to the floorplan to determine the geolocation of the building space; and
   the equipment geolocator is configured to use the geolocation of the floorplan and the location of the building equipment relative to the floorplan to determine the geolocation of the building equipment.

3. The building management system of claim 1, wherein:
   the space geolocator is configured to generate and provide a graphical user interface that displays the floorplan overlaid onto the map; and
   the first input defining the location of the building space relative to the floorplan comprises a user input received via the graphical user interface.

4. The building management system of claim 1, wherein the first input defining the location of the building space relative to the floorplan comprises a user drawing a border of the building space onto the floorplan via a graphical user interface.

5. The building management system of claim 1, wherein:
the equipment geolocator is configured to generate and provide graphical user interface that displays the floorplan overlaid onto the map; and
the second input defining the location of the building equipment relative to the floorplan comprises a user input received via the graphical user interface.

6. The building management system of claim 1, wherein the second input defining the location of the building equipment relative to the floorplan comprises a user placing an icon representing the building equipment onto the floorplan via a graphical user interface.

7. The building management system of claim 1, wherein the parent space detector is configured to identify a parent space for the building equipment, wherein identifying the parent space for the building equipment comprises:
identifying a smallest existing building space that contains the building equipment; and
setting the identified building space as the parent space for the building equipment.

8. The building management system of claim 1, wherein the parent space detector is configured to identify a parent space for the building space, wherein identifying the parent space for the building space comprises:
determining an area of the building space;
determining a location of a centroid of the building space;
identifying a smallest existing building space that contains the centroid and has an area larger than the area of the building space; and
setting the identified building space as the parent space for the building space.

9. The building management system of claim 1, further comprising an alarm manager that generates and provides a graphical user interface for viewing and managing alarms in the building management system;
wherein the alarm manager is configured to receive a user input via the graphical user interface, the user input comprising a desired control action for the building space without identifying the building equipment;
wherein the space controller is configured to use the spatial relationship between the building space and the building equipment to identify the building equipment and generate the control signal for the building equipment to effect the desired control action.

10. A method for establishing relationships between building spaces and building equipment in a building management system comprising at least one of a controller or a client device having one or more processors, the method comprising:
generating and providing, by the one or more processors, a control signal from the controller to building equipment located within a building space;
overlaying, by the one or more processors, a building floorplan onto a map providing geolocation data;
receiving, by the one or more processors, a first input defining a location of the building space relative to the floorplan and a second input defining a location of the building equipment relative to the floorplan;
determining, by the one or more processors, a geolocation of the building space and a geolocation of the building equipment using the geolocation data; and
identifying, by the one or more processors, a spatial relationship between the building space and the building equipment using geometric heuristics and the geolocations of the building space and the building equipment;
using, by the one or more processors, the spatial relationship between the building space and the building equipment to generate the control signal provided to the building equipment.

11. The method of claim 10, further comprising:
determining a geolocation of the floorplan using the geolocation data provided by the map;
using the geolocation of the floorplan and the location of the building space relative to the floorplan to determine the geolocation of the building space; and
using the geolocation of the floorplan and the location of the building equipment relative to the floorplan to determine the geolocation of the building equipment.

12. The method of claim 10, further comprising generating and providing a graphical user interface that displays the floorplan overlaid onto the map;
wherein at least one of the first input defining the location of the building space relative to the floorplan and the second input defining the location of the building equipment relative to the floorplan comprises a user input received via the graphical user interface.

13. The method of claim 10, wherein the first input defining the location of the building space relative to the floorplan comprises a user drawing a border of the building space onto the floorplan via a graphical user interface.

14. The method of claim 10, wherein the second input defining the location of the building equipment relative to the floorplan comprises a user placing an icon representing the building equipment onto the floorplan via a graphical user interface.

15. The method of claim 10, wherein identifying the spatial relationship between the building space and the building equipment comprises:
identifying a parent space for the building equipment; and
determining whether the building space is the parent space for the building equipment.

16. The method of claim 15, wherein identifying the parent space for the building equipment comprises:
identifying a smallest existing building space that contains the building equipment; and
setting the identified building space as the parent space for the building equipment.

17. The method of claim 10, further comprising identifying a parent space for the building space, wherein identifying the parent space for the building space comprises:
determining an area of the building space;
determining a location of a centroid of the building space;
identifying a smallest existing building space that contains the centroid and has an area larger than the area of the building space; and
setting the identified building space as the parent space for the building space.

18. The method of claim 10, further comprising:
providing a graphical user interface for viewing and managing alarms in the building management system;
receiving a user input via the graphical user interface, the user input comprising a desired control action for the building space without identifying the building equipment;
using the spatial relationship between the building space and the building equipment to identify the building equipment; and
generating the control signal for the building equipment to effect the desired control action.

19. A building management system comprising:
building equipment located within a building space;
at least one of a building management system (BMS) controller or a client device comprising one or more processing circuits having one or more processors and memory, the one or more processing circuits comprising:
- a space controller configured to receive input from the building equipment and provide a control signal to the building equipment;
- a space geolocator configured to receive a first input defining a location of the building space relative to a map and determine a geolocation of the building space using geolocation data provided by the map;
- an equipment geolocator configured to receive a second input defining a location of the building equipment relative to the map and determine a geolocation of the building equipment using the geolocation data provided by the map; and
- a parent space detector configured to use geometric heuristics to identify the building space as a parent space that contains the building equipment;

wherein the space controller is configured to establish a control relationship between the building space and the building equipment in response to identifying the building space as the parent space and use the control relationship to generate the control signal provided to the building equipment.

20. The building management system of claim 19, further comprising an alarm manager configured to generate a graphical user interface for viewing and managing alarms in the building management system;
wherein the alarm manager is configured to receive a user input via the graphical user interface, the user input comprising a desired control action for the building space without identifying the building equipment;
wherein the space controller is configured to receive the desired control action from the alarm manager and use the control relationship between the building space and the building equipment to identify the building equipment and generate one or more control signals for the building equipment.

* * * * *